US008125771B2

(12) United States Patent
Yukawa et al.

(10) Patent No.: US 8,125,771 B2
(45) Date of Patent: Feb. 28, 2012

(54) ELECTRONIC APPARATUS

(75) Inventors: Shuhei Yukawa, Tokyo (JP); Masafumi Tanaka, Tochigi (JP); Yutaka Ogasawara, Saitama (JP); Tooru Kuronuma, Kanagawa (JP)

(73) Assignee: Sony Corporation, Tokyo (JP)

( * ) Notice: Subject to any disclaimer, the term of this patent is extended or adjusted under 35 U.S.C. 154(b) by 511 days.

(21) Appl. No.: 11/687,742

(22) Filed: Mar. 19, 2007

(65) Prior Publication Data
US 2007/0236873 A1    Oct. 11, 2007

(30) Foreign Application Priority Data

Apr. 11, 2006  (JP) ................................. 2006-108660

(51) Int. Cl.
G06F 1/16        (2006.01)
H05K 7/00        (2006.01)
H05K 5/00        (2006.01)

(52) U.S. Cl. .............. 361/679.21; 361/679.23; 313/582; 349/58

(58) Field of Classification Search ............ 361/679.21, 361/679.22, 679.26, 679.23; 349/58–60; 313/582
See application file for complete search history.

(56) References Cited

U.S. PATENT DOCUMENTS

| | | | | |
|---|---|---|---|---|
| 4,748,756 A * | 6/1988 | Ross | ................................ | 40/715 |
| 4,980,676 A * | 12/1990 | Nomura et al. | ............. | 361/679.2 |
| D324,036 S * | 2/1992 | Wakasa | ........................ | D14/329 |
| 5,157,585 A * | 10/1992 | Myers | ...................... | 361/679.17 |
| 5,268,816 A * | 12/1993 | Abell et al. | .............. | 361/679.09 |
| 5,450,221 A * | 9/1995 | Owen et al. | ...................... | 349/58 |
| 5,570,267 A * | 10/1996 | Ma | ............................ | 361/679.21 |
| 5,815,225 A * | 9/1998 | Nelson | ...................... | 361/679.26 |
| 5,887,962 A * | 3/1999 | Tsai | ....................... | 312/223.2 |
| 5,927,673 A * | 7/1999 | Kurokawa et al. | ............ | 248/456 |
| 5,929,950 A * | 7/1999 | Matsuda | ......................... | 349/60 |
| 6,028,764 A * | 2/2000 | Richardson et al. | ...... | 361/679.29 |
| 6,151,207 A * | 11/2000 | Kim | ......................... | 361/679.26 |
| 6,220,741 B1 * | 4/2001 | Kawachi et al. | .............. | 362/561 |
| 6,373,537 B2 * | 4/2002 | Yun et al. | ........................ | 349/58 |
| 6,480,372 B1 * | 11/2002 | Vong et al. | ............... | 361/679.09 |
| 6,515,721 B2 * | 2/2003 | Jin et al. | ........................... | 349/58 |

(Continued)

FOREIGN PATENT DOCUMENTS

CN           2446583 Y        9/2001

(Continued)

OTHER PUBLICATIONS

U.S. Appl. No. 11/695,318, filed Apr. 2, 2007, Yukawa, et al.

(Continued)

*Primary Examiner* — Jinhee Lee
*Assistant Examiner* — Adrian S Wilson
(74) *Attorney, Agent, or Firm* — Oblon, Spivak, McClelland, Maier & Neustadt, L.L.P.

(57) ABSTRACT

Disclosed herein is an electronic apparatus, including: a base chassis formed as a unitary member from a transparent material and having two faces positioned on the opposite sides to each other and individually formed as a first mounting face section and a second mounting face section; a display unit having a display panel thereon and attached to said first mounting face section of said base chassis; a control circuit board attached to said second mounting face section of said base chassis; and a rear cover attached to said second mounting face section of said base chassis and configured to cover said control circuit board.

13 Claims, 27 Drawing Sheets

U.S. PATENT DOCUMENTS

| | | | |
|---|---|---|---|
| 6,549,263 B1* | 4/2003 | Kim | 349/58 |
| 6,697,250 B2* | 2/2004 | Kuo | 361/679.6 |
| 6,741,299 B2* | 5/2004 | Fukayama et al. | 349/58 |
| 6,768,636 B2* | 7/2004 | Itoh | 361/679.05 |
| 6,776,497 B1* | 8/2004 | Huppi et al. | 362/85 |
| 6,777,621 B2* | 8/2004 | Ishikawa et al. | 174/260 |
| 6,819,371 B2* | 11/2004 | Kanatsu | 349/58 |
| 7,149,080 B2* | 12/2006 | Jackson, Jr. | 361/679.21 |
| 7,436,657 B2* | 10/2008 | Motai et al. | 361/679.55 |
| 7,457,120 B2* | 11/2008 | Bae et al. | 361/704 |
| 7,508,655 B2* | 3/2009 | Baek | 349/56 |
| 7,728,918 B2* | 6/2010 | Sakurai | 349/58 |
| 2001/0003471 A1* | 6/2001 | Lee et al. | 349/58 |
| 2001/0019377 A1* | 9/2001 | Fukayama et al. | 349/58 |
| 2002/0027634 A1* | 3/2002 | Kang et al. | 349/150 |
| 2002/0149905 A1 | 10/2002 | Jackson, Jr. | |
| 2004/0233127 A1* | 11/2004 | Niitsu et al. | 345/60 |
| 2005/0047073 A1* | 3/2005 | Lo | 361/683 |
| 2005/0243505 A1* | 11/2005 | Jackson et al. | 361/683 |
| 2006/0028790 A1* | 2/2006 | Baek | 361/681 |
| 2006/0132414 A1* | 6/2006 | Yiu | 345/98 |
| 2006/0139271 A1* | 6/2006 | Okuda | 345/88 |
| 2006/0152614 A1* | 7/2006 | Wang et al. | 348/333.06 |
| 2007/0034402 A1* | 2/2007 | Cheng | 174/260 |

FOREIGN PATENT DOCUMENTS

| | | |
|---|---|---|
| JP | 10-312160 | 11/1998 |
| JP | 2002-260426 | 9/2002 |
| JP | 3096746 | 7/2003 |
| JP | 2004-72239 | 3/2004 |
| JP | 2005-070661 | 3/2005 |
| JP | 2005-070662 | 3/2005 |
| JP | 2005-136651 | 5/2005 |
| JP | 2006-030313 | 2/2006 |

OTHER PUBLICATIONS

U.S. Appl. No. 12/685,002, filed Jan. 11, 2010, Yukawa, et al.

Office Action issued Nov. 11, 2011, in Japanese Patent Application No. 2006-108660.

* cited by examiner

ELECTRONIC APPARATUS

CROSS REFERENCES TO RELATED APPLICATIONS

The present invention contains subject matter related to Japanese Patent Application JP 2006-108660 filed in the Japan Patent Office on Apr. 11, 2006, the entire contents of which being incorporated herein by reference.

BACKGROUND OF THE INVENTION

1. Field of the Invention

This invention relates to an electronic apparatus, and more particularly to an electronic apparatus which includes a base chassis formed as a unitary member from a transparent material.

2. Description of the Related Art

An electronic apparatus such as a personal computer, a personal digital assistant (PDA) or a television receiver includes a display panel for displaying an image.

Some electronic apparatus is configured such that a panel section is provided on the front face side of the display panel and formed from a transparent material. One of electronic apparatus of the type described is disclosed, for example, in Japanese Patent Laid-Open No. 2004-72239 (hereinafter referred to as Patent Document 1).

In the electronic apparatus disclosed in Patent Document 1, a display unit having a transparent front panel is disposed on the inner side of a bracket formed as a rectangular framework. The front panel is attached to the front face of the bracket such that it covers the display unit from the front side. The front panel has an outer profile greater than that of the display panel, and outer peripheral portions of the front panel are positioned on the outer peripheral side of the display panel.

SUMMARY OF THE INVENTION

However, in the existing electronic apparatus described above, since the front panel formed from a transparent material functions only as a decorative plate for covering the display panel from the front side, the front panel and the bracket to which various elements are attached exist separately from each other. Therefore, the existing electronic apparatus has a problem in that it is complicated in configuration and a comparatively great number of parts and a comparatively great number of man-hours for assembly are requisite.

Therefore, it is demanded to provide an electronic apparatus which is simplified in configuration and can be assembled readily.

In order to satisfy the demand, according to the present invention, requisite members are attached to the opposite faces of a base chassis formed as a unitary member from a transparent material.

In particular, according to the present invention, there is provided an electronic apparatus including a base chassis formed as a unitary member from a transparent material and having two faces positioned on the opposite sides to each other and individually formed as a first mounting face section and a second mounting face section, a display unit having a display panel thereon and attached to the first mounting face section of the base chassis, a control circuit board attached to the second mounting face section of the base chassis, and a rear cover attached to the second mounting face section of the base chassis and configured to cover the control circuit board.

In the electronic apparatus, the base chassis functions not only as a decorative plate but also as a bracket to which various elements are attached.

With the electronic apparatus, the configuration is simplified and the number of parts is reduced, and consequently, the number of man-hours can be reduced.

The electronic apparatus may be configured such that the base chassis has a mounting recess formed at a portion thereof other than an outer peripheral portion of the first mounting face section, the base chassis having the outer peripheral portion, a bottom face portion positioned on the inner side of the outer peripheral portion and extending in parallel to the outer peripheral portion, and a connecting portion configured to connect to an inner peripheral edge of the outer peripheral portion and an outer peripheral edge of the bottom face portion and bent with respect to the outer peripheral portion and the bottom face portion, the display panel being inserted in the mounting recess so as to be attached to the base chassis. With the electronic apparatus, high strength can be provided to the base chassis.

In this instance, the bottom face portion of the base chassis may be formed with a thickness smaller than the thickness of the outer peripheral portion. With the electronic apparatus, reduction in thickness can be anticipated while high strength of the base chassis is assured.

The electronic apparatus may further include a stand supported for pivotal motion on a rear face of the cover such that the electronic apparatus is placed on a receiving face through the stand and the base chassis. With the electronic apparatus, there is no necessity provide a support for exclusive use other than the base chassis, and consequently, reduction of the number of parts and simplification of the structure can be anticipated.

In this instance, the electronic apparatus may further include a holding member attached to a lower end portion of the base chassis, and an elastic placement pad attached to the holding member and configured to contact with the receiving face. With the electronic apparatus, stabilization of a state wherein it is placed on the receiving face can be anticipated.

DETAILED DESCRIPTION OF THE PREFERRED EMBODIMENT

In the following, the present invention is described in connection with a preferred embodiment thereof. In the embodiment described, the present invention is applied to an electronic apparatus in the form of a personal computer.

It is to be noted that the application of the electronic apparatus according to the present invention is not limited to a personal computer, but the electronic apparatus of the present invention can be applied widely to various electronic apparatus such as information processing apparatus such as, for example, a personal digital assistant (PDA), a network terminal, a portable information terminal and a working station, acoustic apparatus, electronic appliances for home use and so forth.

In the following description, for the convenience of illustration and description, upward, downward, forward, rearward, leftward and rightward directions are defined with respect to the direction in which a user visually observes the display screen of the personal computer, and this side (user side) with respect to the display screen is defined as a forward direction while the leftward and rightward directions of the user are defined as leftward and rightward directions, respectively.

Figure 1:
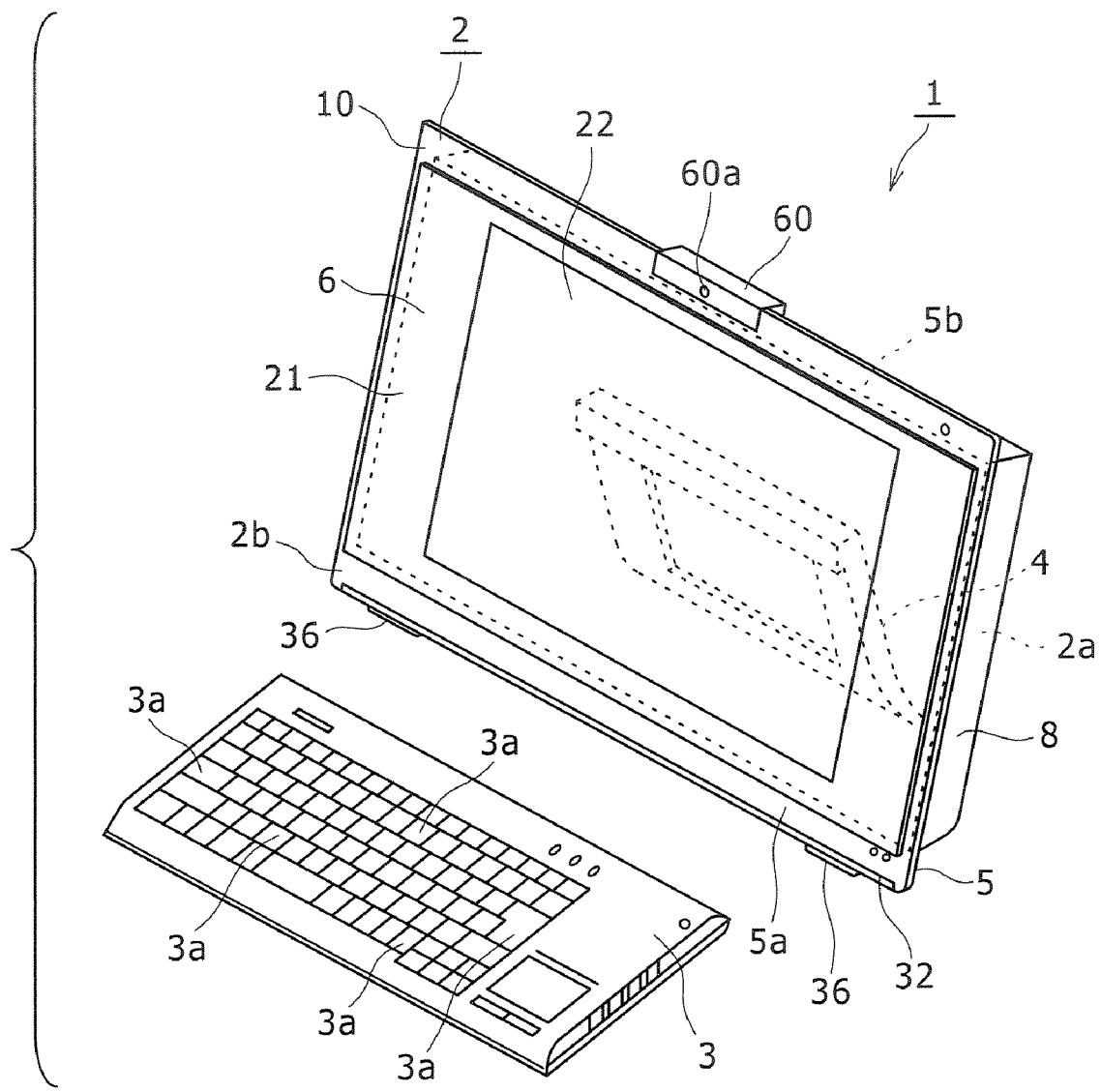
FIG. 1 is a perspective view of an electronic apparatus to which the present invention is applied.

Referring first to FIG. 1, the electronic apparatus 1 shown includes an apparatus body 2, a keyboard 3, and a stand 4 supported for pivotal motion on a rear face 2a of the apparatus body 2.

The keyboard 3 is, for example, disconnected from the apparatus body 2 and has predetermined operation keys 3a provided thereon. If any of the operation keys 3a of the keyboard 3 is operated, then a signal corresponding to the operated operation key 3a is outputted from the keyboard 3. The outputted signal is inputted by radio communication to a reception section not shown provided on the apparatus body 2, and various processes are executed in response to the operation of the operation key 3a by the apparatus body 2.

Since the keyboard 3 of the electronic apparatus 1 is separate from the apparatus body 2 in this manner, it can be used at an arbitrary position as occasion demands within a range within which the radio signal can be received by the apparatus body 2.

Figure 2:
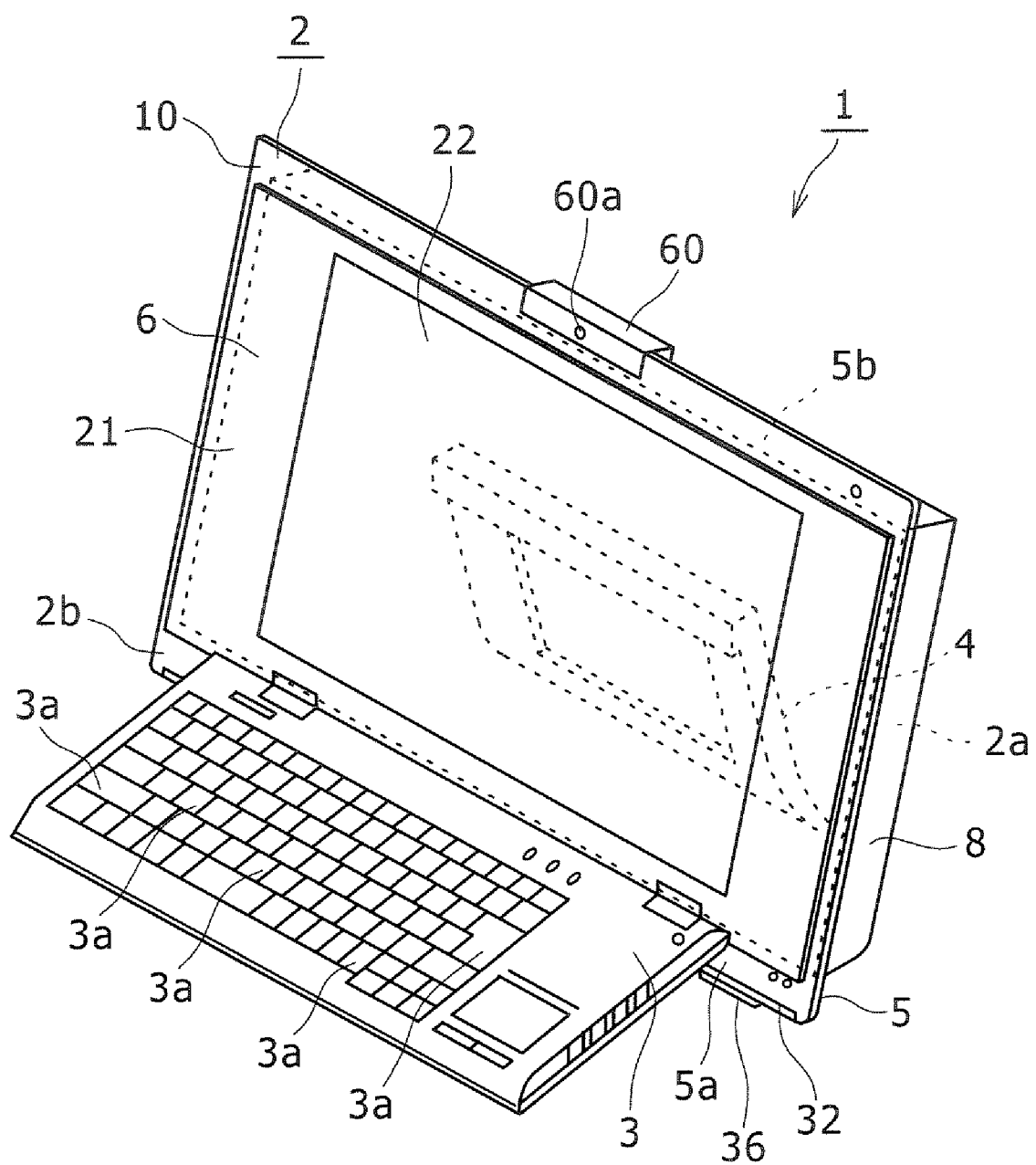
FIG. 2 is a similar view but showing an electronic apparatus of a different type.

It is to be noted that the electronic apparatus is not limited to an apparatus of the type wherein the keyboard 3 is separate from the apparatus body 2. In particular, the electronic apparatus may be formed as such an electronic apparatus 1 as shown in FIG. 2 which includes an apparatus body 2, a keyboard 3 supported for folding movement on a front face 2b of the apparatus body 2, and a stand 4 supported for pivotal motion of a rear face 2a of the apparatus body 2. The electronic apparatus 1 has an advantage that the arrangement space when the keyboard 3 is not used is reduced because the keyboard 3 can be folded when the electronic apparatus 1 is not used.

Figure 3:
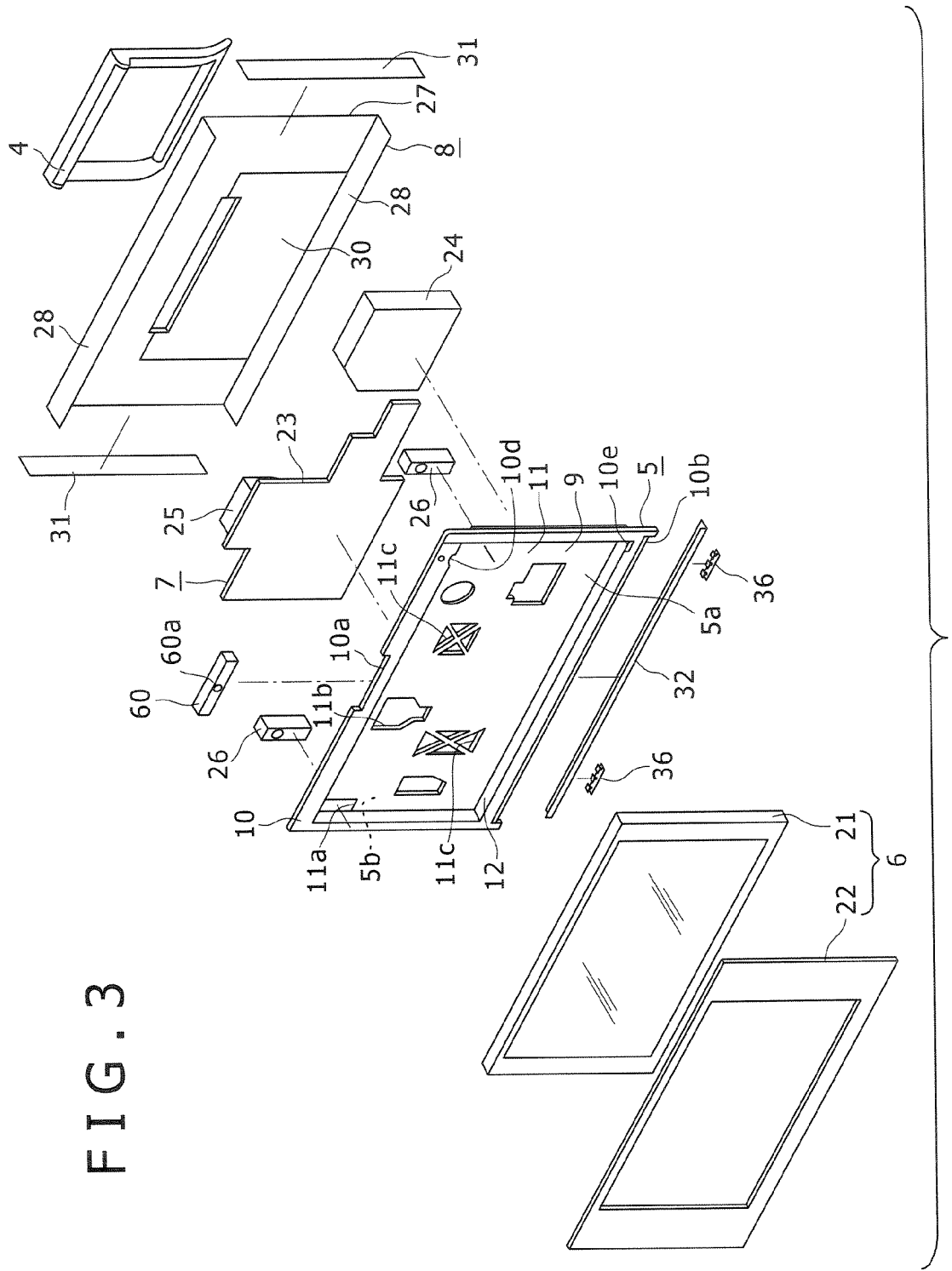
FIG. 3 is a schematic exploded perspective view of the electronic apparatus of FIG. 1.
Figure 4:
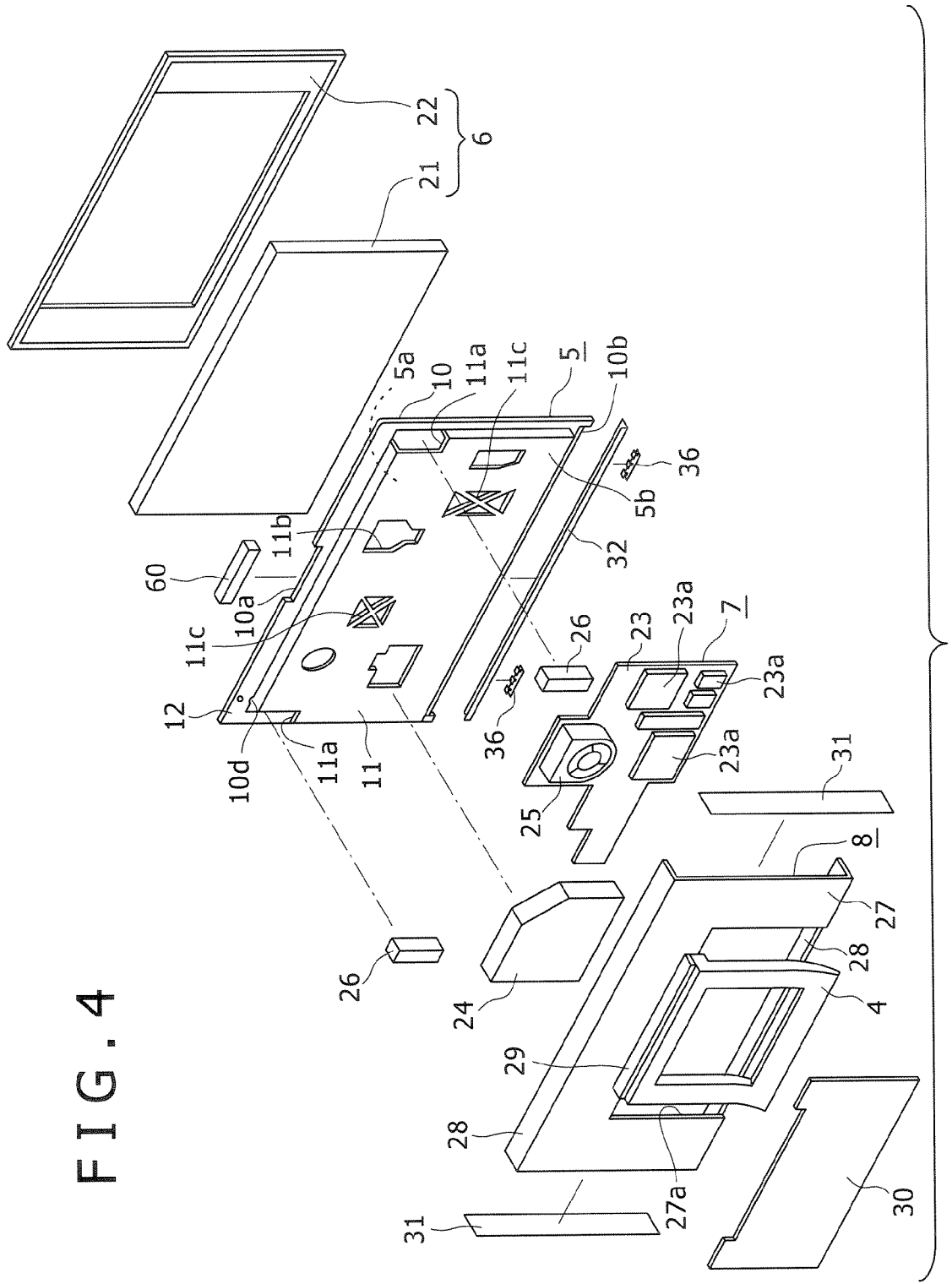
FIG. 4 is a schematic exploded perspective view of the electronic apparatus as viewed from the opposite side to that in FIG. 3.

Referring now to FIGS. 3 and 4, the apparatus body 2 has various requisite members attached to the opposite front and rear faces of a base chassis 5. In particular, the apparatus body 2 includes a base chassis 5, a display unit 6 attached to the front face of the base chassis 5, and a control circuit board 7 and a rear cover 8 attached to the rear face of the base chassis 5.

The base chassis 5 is formed as a plate directed in the forward and backward directions by injection molding using a transparent material such as, for example, an acrylic resin material. The front face of the base chassis 5 is formed as a first mounting face section 5a while the rear face of the base chassis 5 is formed as a second mounting face section 5b.

The base chassis 5 has a mounting recess 9 formed therein so as to be open forwardly. The mounting recess 9 is formed at a portion of the base chassis 5 except an outer peripheral portion 10 and formed as a space defined by a bottom face portion 11 extending in parallel to the outer peripheral portion 10 and a connecting portion 12 extending substantially perpendicularly to the outer peripheral portion 10 and the bottom face portion 11 and connecting the inner peripheral edge of the outer peripheral portion 10 and the outer peripheral edge of the bottom face portion 11 to each other.

The strength of the base chassis 5 can be raised by forming the base chassis 5 such that the outer peripheral portion 10 and the bottom face portion 11 are connected to each other by the connecting portion 12 extending perpendicularly to the outer peripheral portion 10 and the bottom face portion 11 in this manner.

Figure 5:
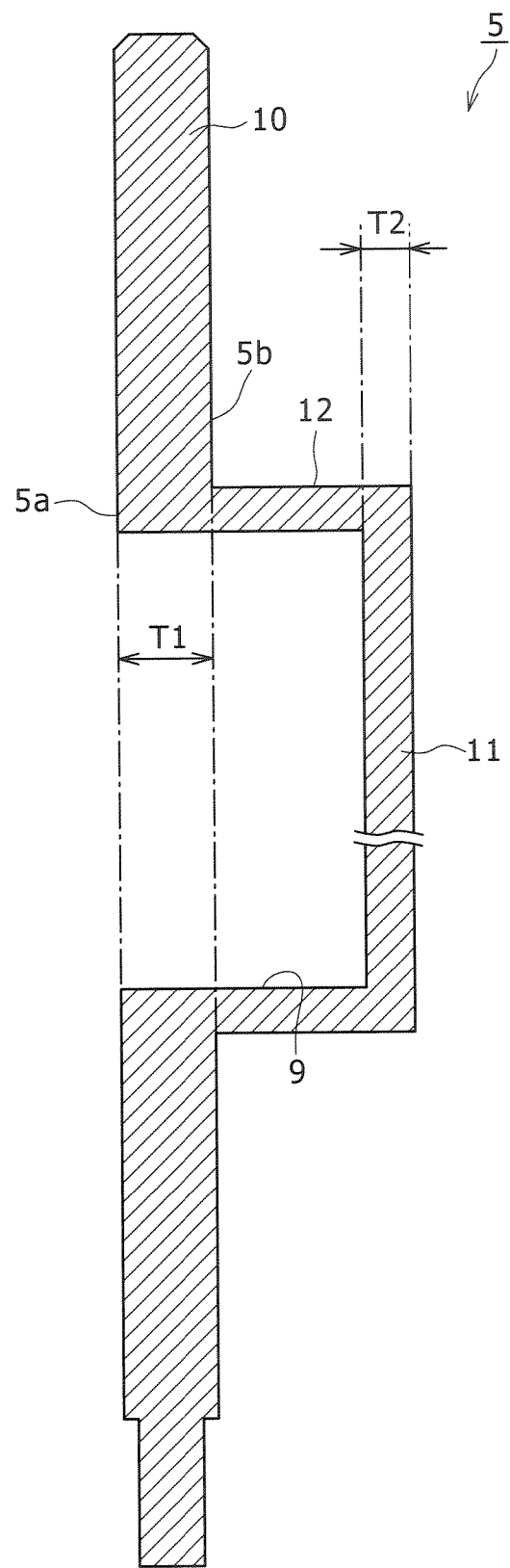
FIG. 5 is a schematic enlarged sectional view of a base chassis.

Referring to FIG. 5, the base chassis 5 is formed such that the thickness T1 of the outer peripheral portion 10 is greater than the thickness T2 of the bottom face portion 11. For example, the thickness T1 of the electronic apparatus 1 is set to 5 mm, and the thickness T2 of the bottom face portion 11 is set to 2.4 mm.

Reduced thickness formation of the base chassis 5 can be achieved while high strength of the base chassis 5 is assured by setting the thickness T1 of the outer peripheral portion 10 greater than the thickness T2 of the bottom face portion 11 in this manner.

Figure 6:
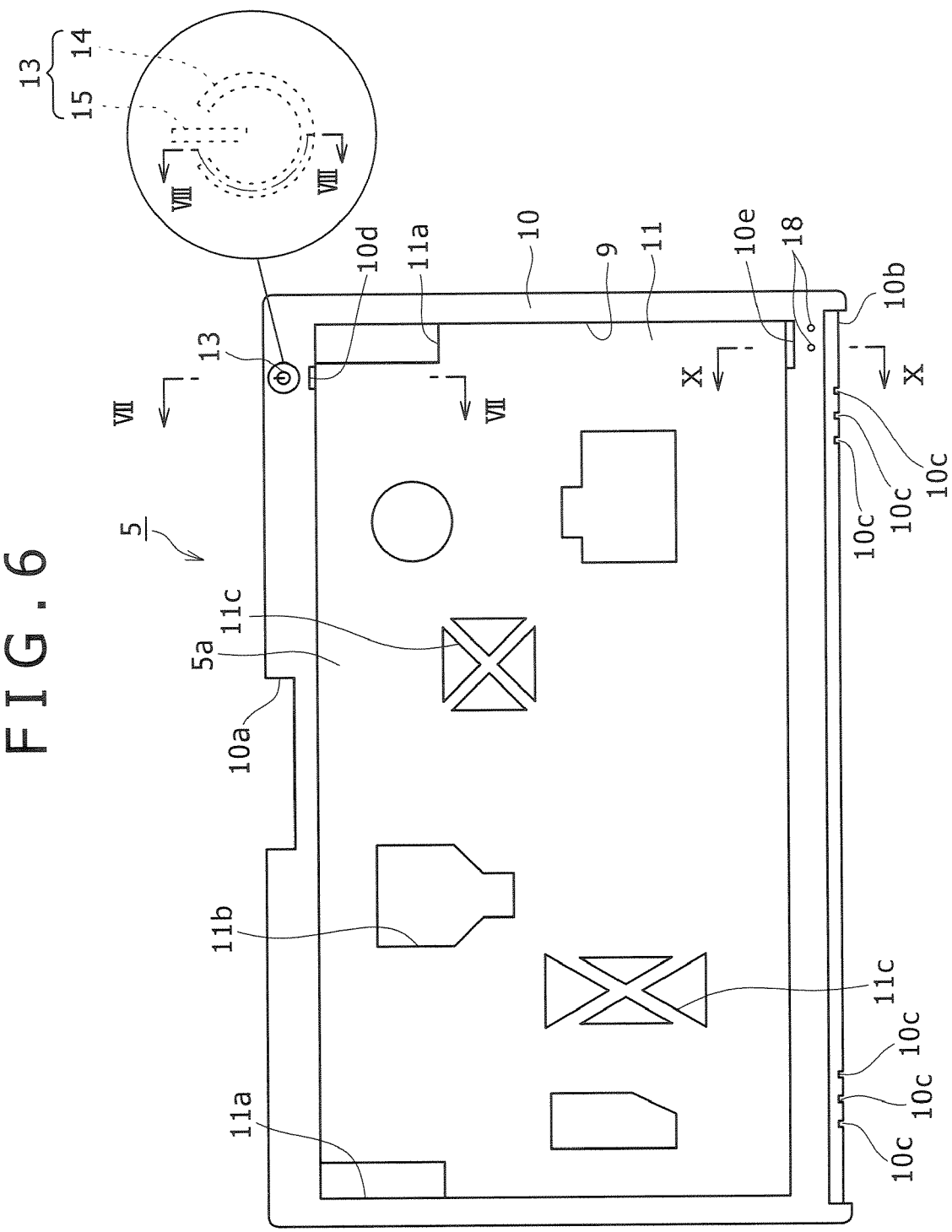
FIG. 6 is a front elevational view of the base chassis.

Referring to FIG. 6, the outer peripheral portion 10 of the base chassis 5 has an arrangement recess 10a formed at a central portion thereof in the leftward and rightward direction in such a manner as to be open upwardly.

A shallow mounting recess 10b is formed at a lower end portion of the outer peripheral portion 10 of the base chassis 5 such that it is open downwardly except the opposite left and right end portions of the outer peripheral portion 10. Three holding recesses 10c are formed at positions rather near to each of the left end and the right end of the mounting recess 10b in such a manner as to open downwardly. The left and right holding recesses 10c are formed in a spaced relationship from each other in the leftward and rightward direction.

A luminous lamp section 13 is formed at an upper end portion of a right end portion of the outer peripheral portion 10 of the base chassis 5. The luminous lamp section 13 includes, for example, a lamp element indicative of a power supply state of the power supply. The luminous lamp section 13 is turned on when the power is supplied, but is turned off when the power is not supplied.

Figure 7:
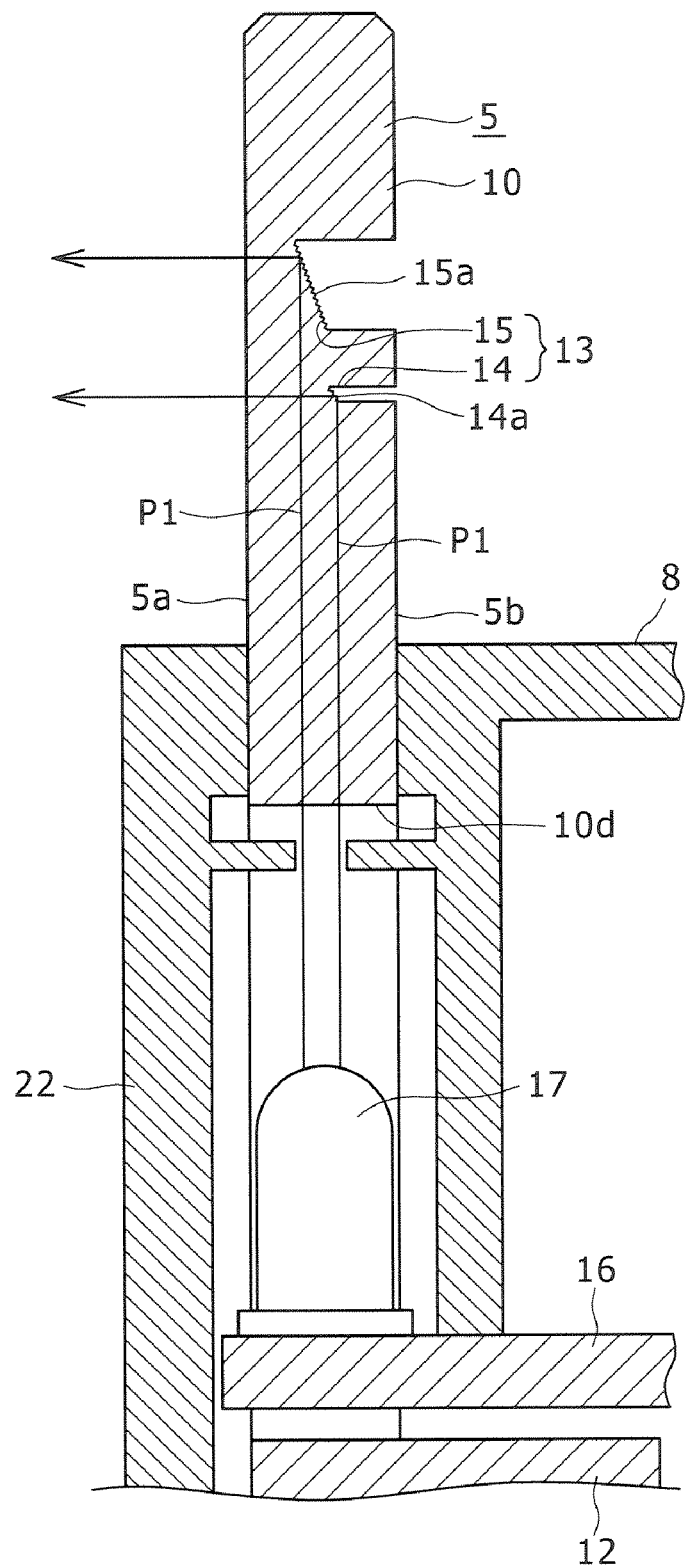
FIG. 7 is an enlarged sectional view taken along line VII-VII of FIG. 6 and showing an element mounting board and a semiconductor light emitting element.

The luminous lamp section 13 is formed by forming a groove open rearwardly in the base chassis 5 as seen in FIG. 7. As seen in FIGS. 6 and 7, the luminous lamp section 13 includes an arcuate portion 14 having an arcuate shape and open upwardly, and a straight portion 15 extending upwardly and downwardly and positioned between the opposite ends of the arcuate portion 14.

Figure 8:
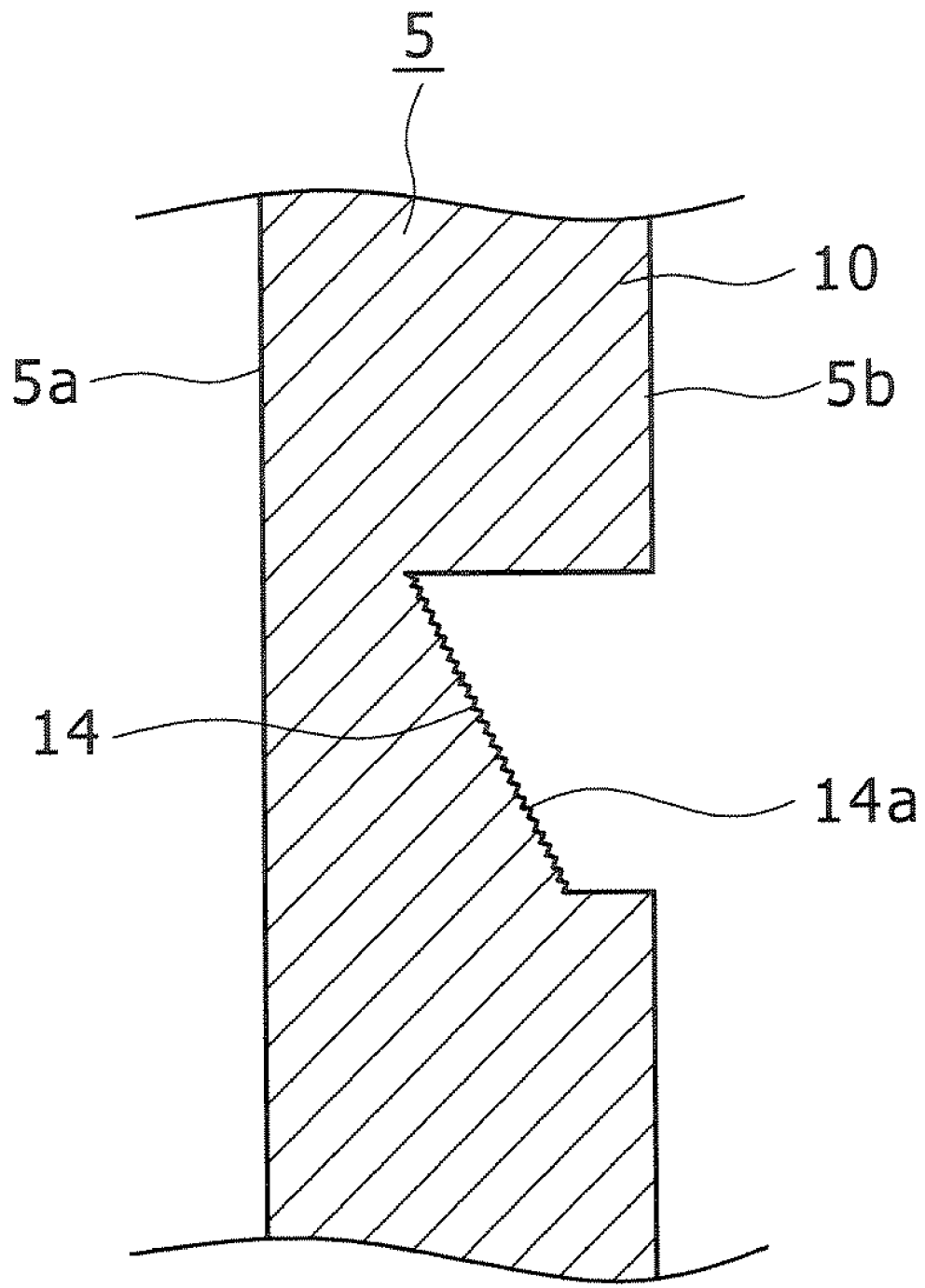
FIG. 8 is an enlarged sectional view taken along line VIII-VIII of FIG. 6.

The arcuate portion 14 has an interior face portion 14a inclined so as to be displaced forwardly in the upward direction while the groove of the arcuate portion 14 is formed such that the depth thereof increases in the upward direction as seen in FIGS. 7 and 8.

The straight portion 15 has an interior face portion 15a inclined so as to be displaced forwardly in the upward direction while the groove of the straight portion 15 is formed such that the depth thereof increases in the upward direction as seen in FIG. 7. The groove at the lower end of the straight portion 15 is formed with a depth same as the depth of the groove at an upper end of a portion of the arcuate portion 14 which is positioned just below the straight portion 15.

The interior face portions 14a and 15a of the arcuate portion 14 and the straight portion 15 are worked so as to have very small concave and convex configurations formed, for example, by embossing.

Figure 9:
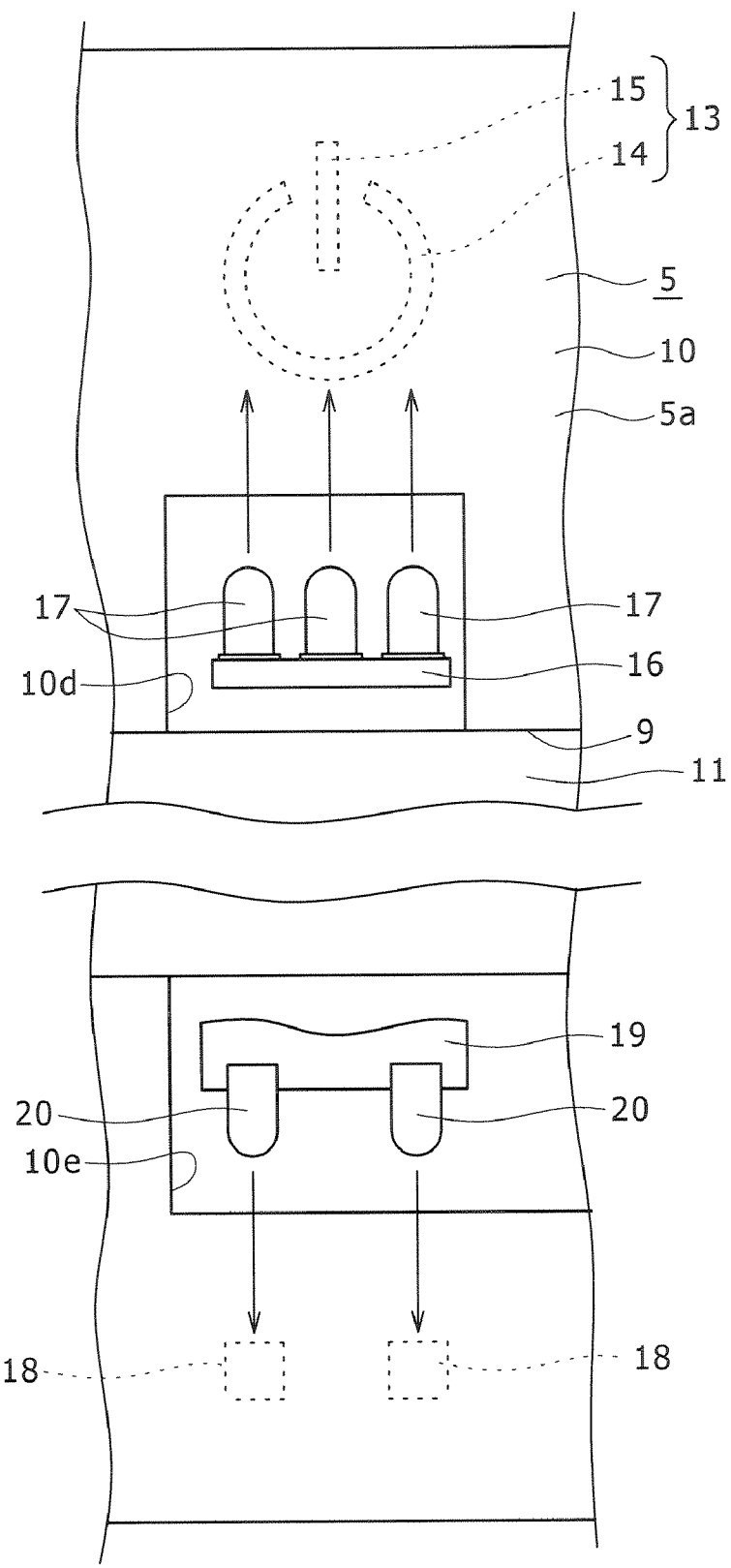
FIG. 9 is an enlarged front elevational view illustrating a positional relationship among the semiconductor light emitting element, a luminous lamp section and a reflective lamp section.

A device mounting board 16 is disposed below the luminous lamp section 13 as seen in FIGS. 7 and 9. The device mounting board 16 is directed in the upward and downward direction and disposed in such a state that it is partly inserted in an upper side device arrangement hole 10d (refer to FIG. 6) formed in the base chassis 5. The upper side device arrangement hole 10d is formed on the immediately lower side of the luminous lamp section 13.

For example, three first semiconductor light emitting elements 17 are carried in a leftwardly and rightwardly spaced relationship from each other on an upper face of the device mounting board 16 as seen in FIG. 9. The first semiconductor light emitting elements 17 are positioned just below the device mounting board 16. Among the first semiconductor light emitting elements 17, for example, a central one emits orange light while the left and right ones emit green light.

Light P1 (refer to FIG. 7) emitted from the first semiconductor light emitting elements 17 is introduced to the interior face portions 14a and 15a of the luminous lamp section 13. In this instance, the light P1 is introduced uniformly into the interior face portions 14a and 15a, and this achieves a high incidence efficiency of the light. This is because the interior face portions 14a and 15a are inclined such that the depths of the grooves of the arcuate portion 14 and the straight portion 15 increase in the upward direction and the depth of the groove at the lower end of the straight portion 15 is formed with a depth same as the depth of the groove at an upper end of the portion of the arcuate portion 14 which is positioned just below the straight portion 15.

When the light P1 is introduced to the luminous lamp section 13, it is reflected at random by the fine concave and convex configurations formed on the interior face portions 14a and 15a and then passes through the inside of the base chassis 5 from the luminous lamp section 13 until it is emitted forwardly from the base chassis 5.

When the electronic apparatus 1 is in a normal operation mode, the light P1 is emitted, for example, from the first semiconductor light emitting elements 17 positioned on the left and right positions, but when the electronic apparatus 1 is in a rest mode, the light P1 is emitted from the centrally positioned first semiconductor light emitting element 17.

Since the electronic apparatus 1 is configured such that the luminous lamp section 13 is provided on the base chassis 5 and the light P1 emitted from the first semiconductor light emitting elements 17 is emitted through the luminous lamp section 13 as described above, enhancement of the visibility can be achieved while the simple structure that the luminous lamp section 13 is formed on the base chassis 5 is assured.

Referring to FIG. 6, a pair of reflective lamp sections 18 is formed at a lower end portion of a right end portion of the outer peripheral portion 10 of the base chassis 5. The reflective lamp sections 18 indicate, for example, a connection state of a wireless LAN (Local Area Network) and an access state to a hard disk drive or the like. For example, the reflective lamp sections 18 emit light or blink when the wireless LAN is in a connected state or the hard disk drive is being accessed, but do not emit light when the wireless LAN is in a disconnected state or the hard disk drive is not being accessed.

Figure 10:
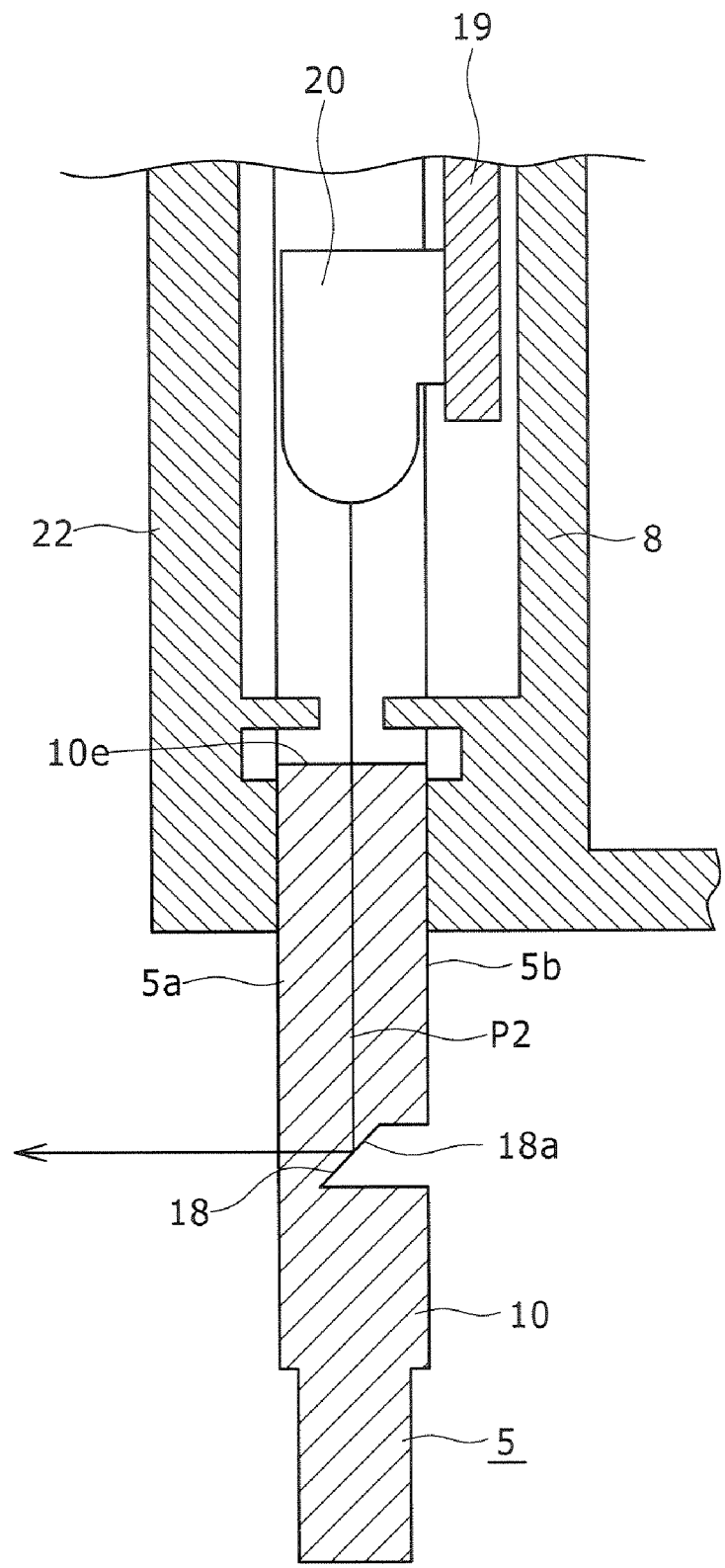
FIG. 10 is an enlarged sectional view taken along line X-X of FIG. 6 and showing the element mounting board and the semiconductor light emitting element.

Referring to FIG. 10, each of the reflective lamp sections 18 is formed by forming a groove open rearwardly in the base chassis 5.

Figure 11:
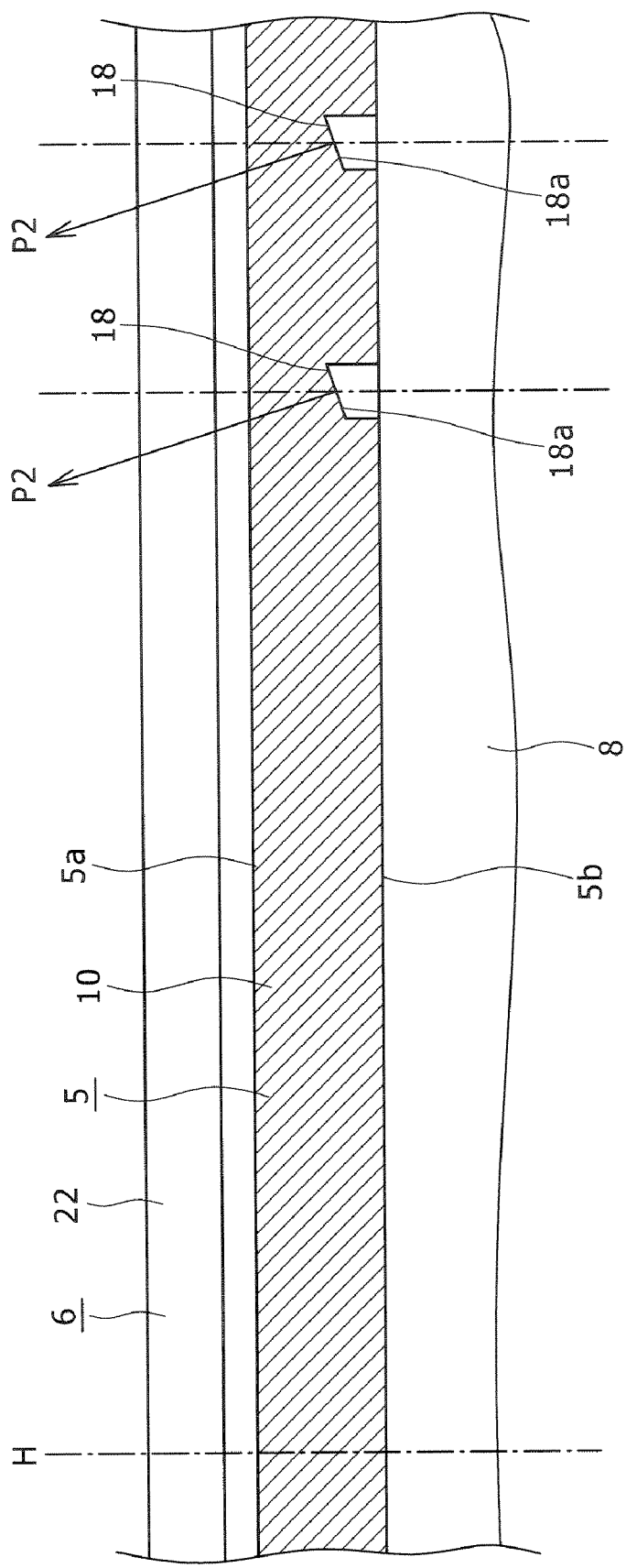
FIG. 11 is an enlarged sectional view showing an outgoing direction of light reflected by the reflective lamp section.

Each of the reflective lamp sections 18 has an interior face portion 18a which is inclined so as to be displaced rearwardly in the downward direction. The interior face portion 18a of each of the reflective lamp sections 18 is also inclined so as to be displaced forwardly in the rightward direction as seen in FIG. 11.

Each of the interior face portions 18a of the reflective lamp sections 18 is formed as a mirror face. A second device mounting board 19 is disposed above the reflective lamp sections 18 and directed in the forward and rearward direction as seen in FIGS. 9 and 10.

For example, two second semiconductor light emitting elements 20 are carried in a spaced relationship from each other in the leftward and rightward direction on a front face of the second device mounting board 19. The second semiconductor light emitting elements 20 are disposed in a lower side element arrangement hole 10e (refer to FIG. 6) formed in the base chassis 5 and are individually positioned just above the reflective lamp sections 18 as seen in FIG. 10. The lower side element arrangement hole 10e is formed just above the reflective lamp sections 18.

Light P2 (refer to FIG. 10) emitted from the second semiconductor light emitting elements 20 is introduced to the interior face portions 18a of the reflective lamp sections 18.

When the light P2 is introduced to the reflective lamp sections 18, it is reflected by the interior face portions 18a and passes through the inside of the base chassis 5 from the reflective lamp sections 18 such that it is emitted forwardly from the base chassis 5.

At this time, since the interior face portions 18a of the reflective lamp sections 18 are inclined so as to be displaced forwardly in the rightward direction as described hereinabove, the light P2 is reflected so as to be directed to the center side of the electronic apparatus 1, that is, toward a normal line H (refer to FIG. 11) which passes the center of the display unit 6.

Accordingly, the light P2 reflected by the reflective lamp sections 18 can be visually observed readily by the user of the electronic apparatus 1. Thus, enhancement of the visual observability can be achieved while assuring the simple structure that the reflective lamp sections 18 are formed by forming the grooved configurations in the base chassis 5.

Referring to FIG. 6, speaker arrangement holes 11a, a connection line threading hole 11b, cooling air stream passing holes 11c and so forth are formed at predetermined positions of the bottom face portion 11 of the base chassis 5. Further, mounting bosses for fastening screws, positioning projections, positioning holes, mounting projections, mounting holes and so forth are formed at demanded positions of the bottom face portion 11 and the connecting portion 12.

Referring to FIGS. 1 to 4, the display unit 6 has a display panel 21 and a front panel 22.

The display panel 21 may be, for example, a liquid crystal panel and has an outer profile a little smaller than that of the bottom face portion 11 of the base chassis 5.

The front panel 22 is formed as a rectangular framework and has an outer profile a little greater than that of the bottom face portion 11 of the base chassis 5.

The display panel 21 is inserted and disposed in the mounting recess 9 of the base chassis 5 and attached to the bottom face portion 11 of the base chassis 5 by suitable means such as fastening screws. The front panel 22 is attached to the base chassis 5 by suitable means such as fastening screws in a state wherein it covers the inner peripheral edge of the outer peripheral portion 10 from the front side in a state wherein the display panel 21 is attached to the base chassis 5. The display panel 21 is held at the outer peripheral edge thereof from the front side by the front panel 22.

When the display panel 21 is driven, heat is generated. The generated heat is transmitted to the rear face side of the base chassis 5 through the cooling air stream passing holes 11c formed in the base chassis 5 and discharged to the outside through heat radiating holes not shown formed in the rear cover 8. Accordingly, the temperature rise of the display panel 21 is suppressed.

The control circuit board 7 performs a control process of the entire electronic apparatus 1. The control circuit board 7 includes a board 23, and predetermined electronic parts 23a such as a CPU (Central Processing Unit) and chip sets carried on the board 23 as seen in FIGS. 3 and 4.

The control circuit board 7 is attached to a predetermined position of the second mounting face section 5b which is the rear face of the base chassis 5 by suitable means such as fastening screws. In a state wherein the control circuit board 7 is attached to the second mounting face section 5b, connection lines not shown extend through the connection line threading hole 11b formed in the base chassis 5 and connect the display panel 21 and a panel driving circuit of the control circuit board 7 to each other.

Predetermined parts including a medium driving section 24 such as a disk drive or a card slot and a cooling fan 25 are attached to the second mounting face section 5b of the base chassis 5 by suitable means such as fastening screws.

A pair of speakers 26 are inserted and arranged in the speaker arrangement holes 11a formed in the base chassis 5 and attached to the base chassis 5 by suitable means such as fastening screws.

By inserting and attaching the speakers 26 in the speaker arrangement holes 11a, the projection amount of the speakers 26 in the forward direction can be reduced thereby to achieve reduction of the thickness of the electronic apparatus 1 when compared with an alternative case wherein the speakers 26 are attached to the first mounting face section 5a of the base chassis 5.

In the state wherein predetermined parts such as the control circuit board 7, medium driving section 24 and cooling fan 25 and requisite elements such as the speakers 26 are attached to the second mounting face section 5b of the base chassis 5 as described above, the rear cover 8 is attached to the second mounting face section 5b by suitable means such as fastening screws such that it covers the parts and the elements from rearwardly.

The rear cover 8 has a base portion 27 directed substantially in the forward and backward direction and a pair of projections 28 projecting forwardly from the opposite upper and lower edges of the base portion 27. A plurality of heat radiating holes not shown is formed in the rear cover 8.

A stand supporting portion 29 is provided at a substantially central portion of the base portion 27 as seen in FIG. 4. A maintenance opening 27a is formed in the base portion 27 on the lower side of the stand supporting portion 29. The maintenance opening 27a is opened or closed by a lid 30 removably mounted on the base portion 27.

If the lid 30 is removed from the base portion 27 to open the maintenance opening 27a, then the control circuit board 7 and so forth are exposed, and consequently, maintenance of the control circuit board 7 and so forth can be performed.

A pair of side covers 31 is attached to the opposite left and right side portions of the rear cover 8.

As described hereinabove, the electronic apparatus 1 is configured such that requisite elements are attached to the first mounting face section 5a and the second mounting face section 5b of the base chassis 5 which is formed as a unitary member from a transparent material. Therefore, the configuration of the electronic apparatus 1 is simple, and also the number of parts is small and reduction of the man-hours for assembly can be achieved.

Figure 12:
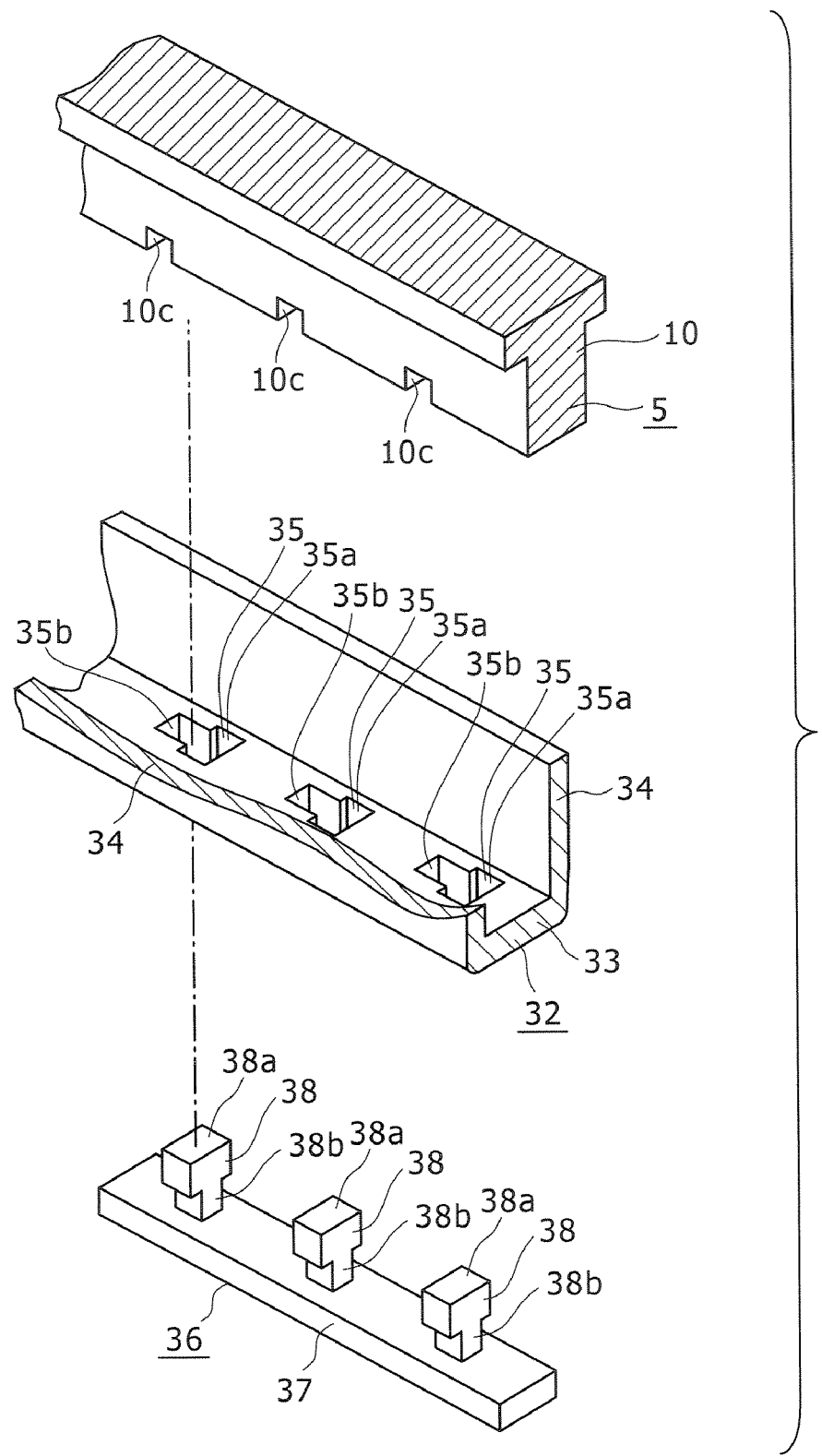
FIG. 12 is an enlarged exploded perspective view showing a lower end portion of the base chassis, a holding member and a placement pad.

A holding member 32 is attached to a lower end portion of the base chassis 5 as seen in FIGS. 3 and 4. The holding member 32 is formed by bending a metal material in the form of a thin plate into a predetermined shape as seen in FIG. 12. Referring to FIG. 12, the holding member 32 has a lower wall portion 33 directed upwardly and downwardly, and a pair of projecting wall portions 34 projecting upwardly from the opposite front and rear edges of the lower wall portion 33.

Three insertion holes 35 are formed at positions rather near to each of the opposite left and right ends of the lower wall portion 33. Each of the insertion holes 35 has a wide portion 35a and a narrow portion 35b having a forward and backward dimension than the wide portion 35a.

Figure 13:
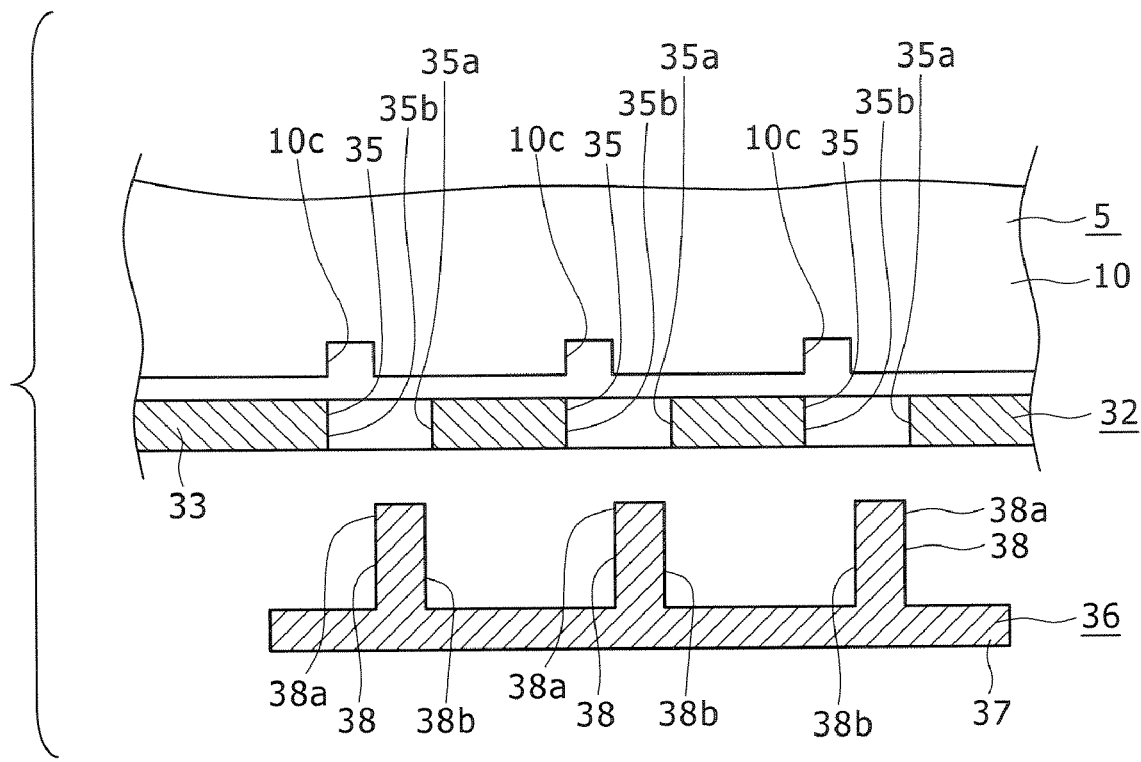
FIG. 13 is an enlarged sectional view showing the placement pad before attached to the holding member.

The holding member 32 is attached in such a manner as to cover the mounting recess 10b formed in the base chassis 5. In the state wherein the holding member 32 is attached to the base chassis 5, a fixed gap is defined between the lower wall portion 33 and the lower face of the base chassis 5 as seen in FIG. 13. In the state wherein the holding member 32 is attached to the base chassis 5, the narrow portions 35b of the insertion holes 35 are positioned just below the holding recesses 10c of the base chassis 5.

Referring to FIG. 12, a pair of placement pads 36 is attached to the holding member 32. Each of the placement pads 36 is formed as a unitary member from a material having elasticity such as a rubber material and has a placement face section 37 formed as a plate directed in the upward and downward direction, and held portions 38 projecting upwardly from the placement face section 37. The held portions 38 are provided in a spaced relationship from each other in the leftward and rightward direction. Each of the placement pads 36 has an inserted portion 38a, and a constricted portion 38b having a dimension in the forward and rearward direction smaller than that of the inserted portion 38a and extending downwardly from the inserted portion 38a. The forward and rearward dimension of the constricted portion 38b is substantially equal to the forward and backward dimension of the insertion holes 35 of the holding member 32.

Each of the placement pads 36 is attached to the holding member 32 in the following manner (refer to FIGS. 14 and 15).

First, in the state wherein the holding member 32 is attached to the base chassis 5 as seen in FIG. 13, the held portions 38 of the placement pad 36 are individually inserted into the wide portions 35a of the insertion holes 35 of the holding member 32, and the held portions 38 are pressed strongly against the lower face of the base chassis 5 from the lower side.

Figure 14:
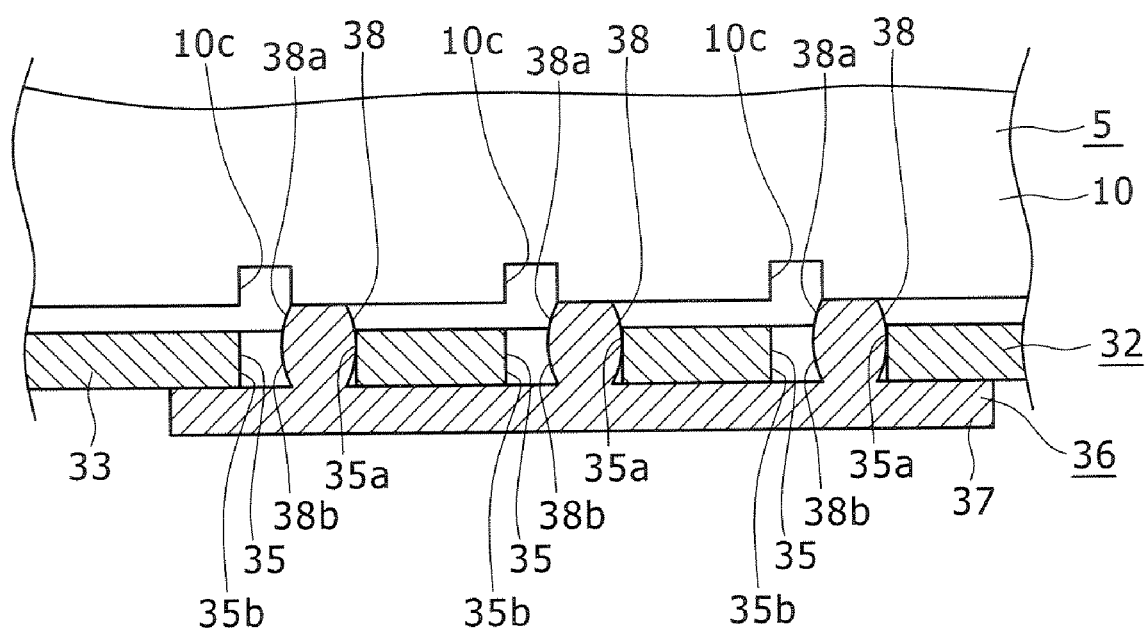
FIG. 14 is an enlarged sectional view showing the placement pad being attached to the holding member.
Figure 15:
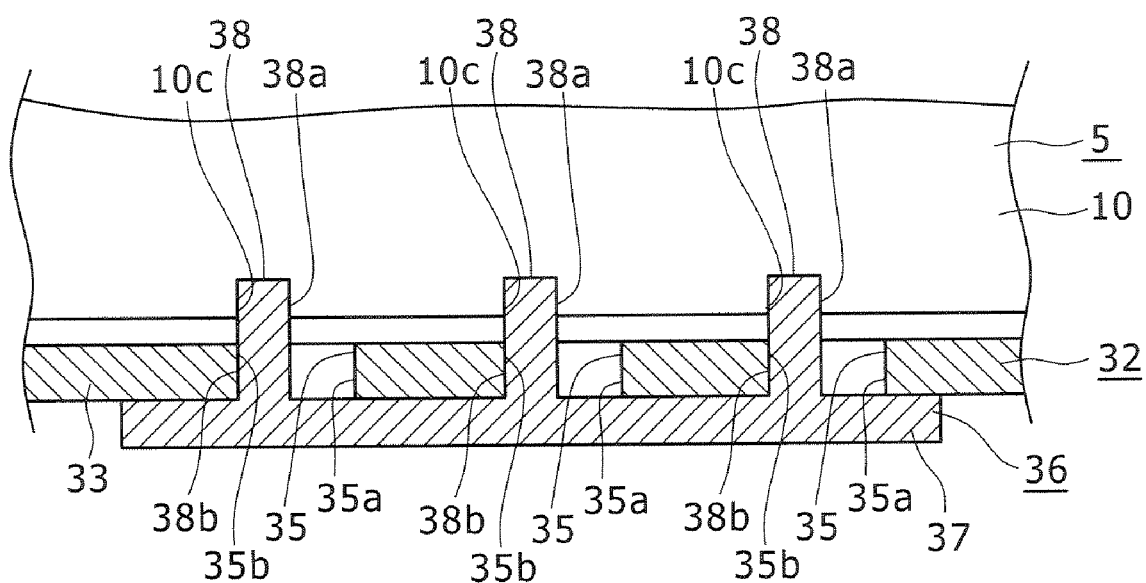
FIG. 15 is an enlarged sectional view showing the placement pad attached to the holding member.

When the held portions 38 are pressed strongly against the lower face of the base chassis 5 from the lower side, they are resiliently deformed into a shape in which they are compressed in the upward and downward direction as seen in FIG. 14.

Then, if the placement pad 36 is slidably moved sidewardly in this state, then the constricted portions 38b are individually inserted into the narrow portions 35b until the inserted portions 38a are individually positioned corresponding to the holding recesses 10c of the base chassis 5. Consequently, the held portions 38 are elastically placed out of the deformed state with the inserted portions 38a inserted in the holding recesses 10c (shown in FIG. 15) thereby to attach the placement pad 36 to the holding member 32.

The placement face sections 37 of the placement pads 36 attached to the insertion holes 32 contact, when the electronic apparatus 1 is placed on a receiving face of a desk or the like, with the receiving face.

In this manner, in the electronic apparatus 1, the holding member 32 is attached to a lower end portion of the base chassis 5 and the placement pads 36 having elasticity are attached to the holding member 32 such that, when the electronic apparatus 1 is placed on a receiving face such as the surface of a desk, the placement face section 37 contact with the receiving face. Therefore, stabilization of the placed state of the electronic apparatus 1 on the receiving face can be anticipated.

Further, since the placement pads 36 contact with the receiving face, otherwise possible damage to the receiving face or the lower end portion of the base chassis 5 can be prevented.

The stand 4 is supported for pivotal motion on the stand supporting portion 29 of the rear cover 8 by means of a pivoting mechanism 39.

Figure 16:
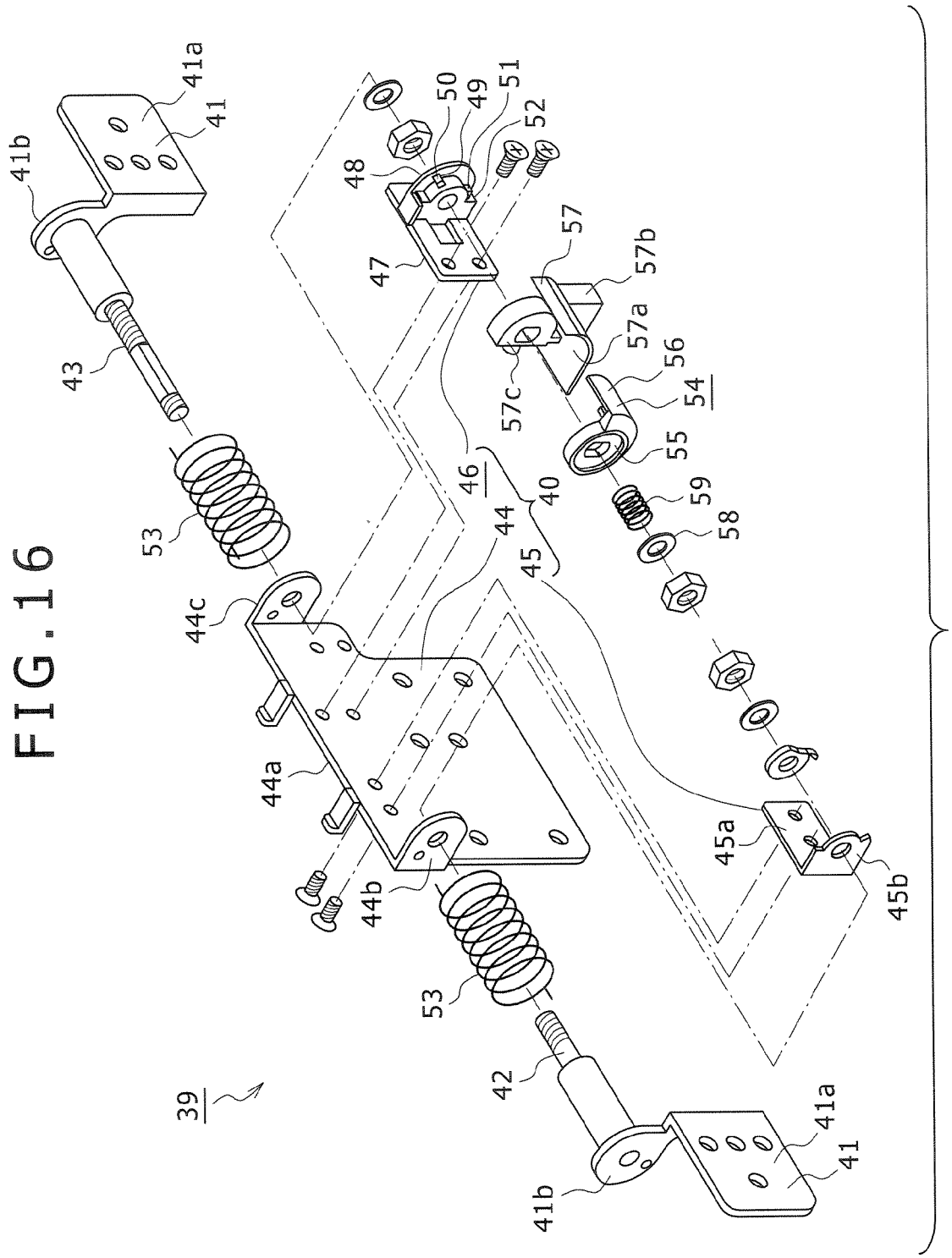
FIG. 16 is an exploded perspective view of a pivoting mechanism.
Figure 17:
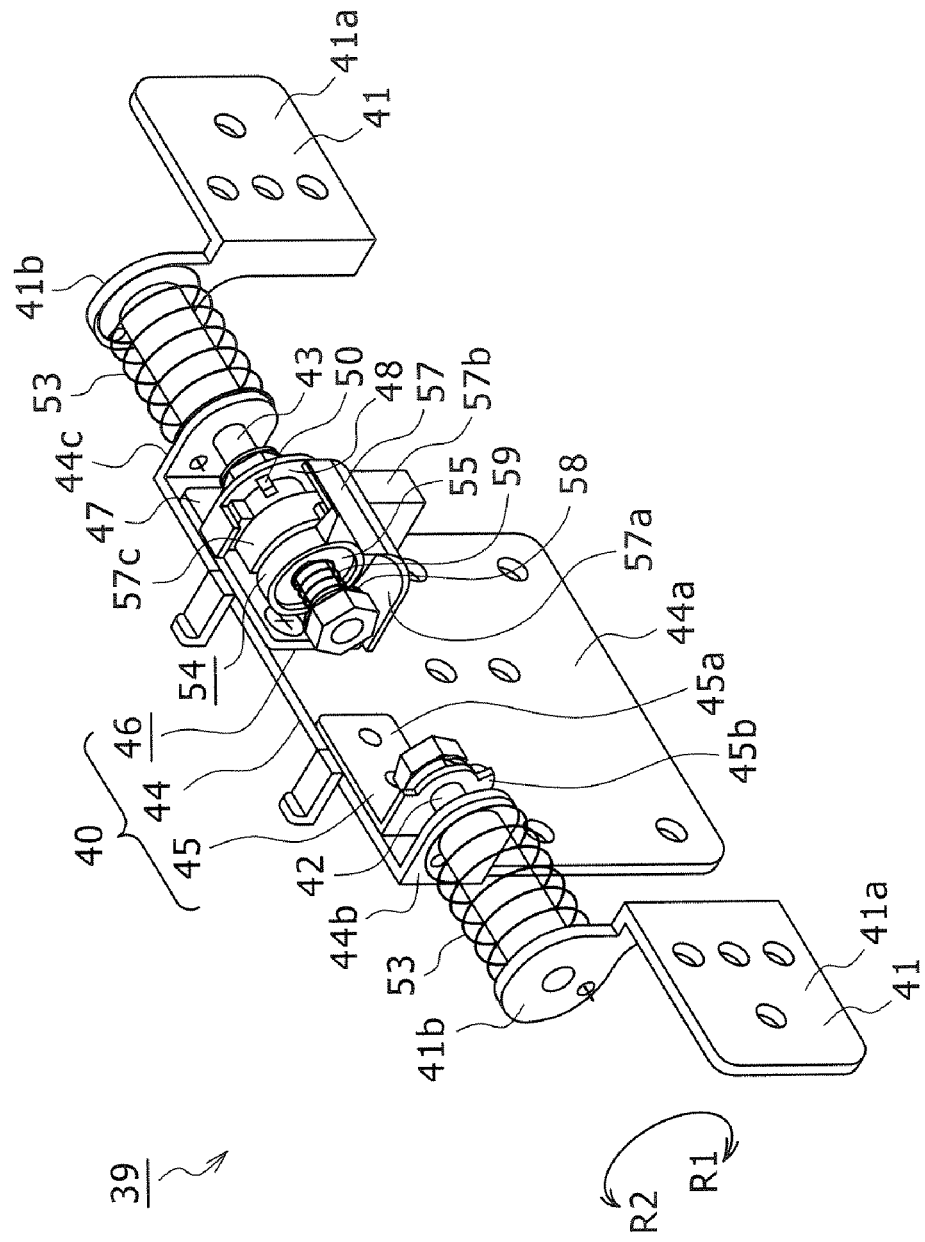
FIG. 17 is a perspective view of the pivoting mechanism.

Referring to FIGS. 16 and 17, the pivoting mechanism 39 includes a body side secured member 40 secured to the apparatus body 2, a pair of stand side secured members 41 secured to the stand 4, and a pair of pivot shafts 42 and 43 for connecting the body side secured member 40 and the stand side secured members 41 to each other.

The body side secured member 40 includes a secured plate 44, and a pair of bearing members 45 and 46 attached to a rear face of the secured plate 44. The bearing members 45 and 46 are positioned in a spaced relationship from each other in the leftward and rightward direction.

The secured plate 44 has a secured portion 44a secured in the inside of the apparatus body 2, and a pair of shaft supporting tabs 44b and 44c projecting rearwardly from the opposite left and right side edges of the secured portion 44a, respectively.

The bearing member 45 includes a mounted plate portion 45a attached to the secured plate 44, and a bearing portion 45b projecting rearwardly from one of the opposite side edges of the secured portion 44a.

The bearing member 46 includes a mounted plate portion 47 attached to the secured plate 44, a bearing portion 48 projecting rearwardly from one of the opposite side edges of the mounted plate portion 47, and a locking portion 49 provided on a right side face of the bearing portion 48.

Figure 18:
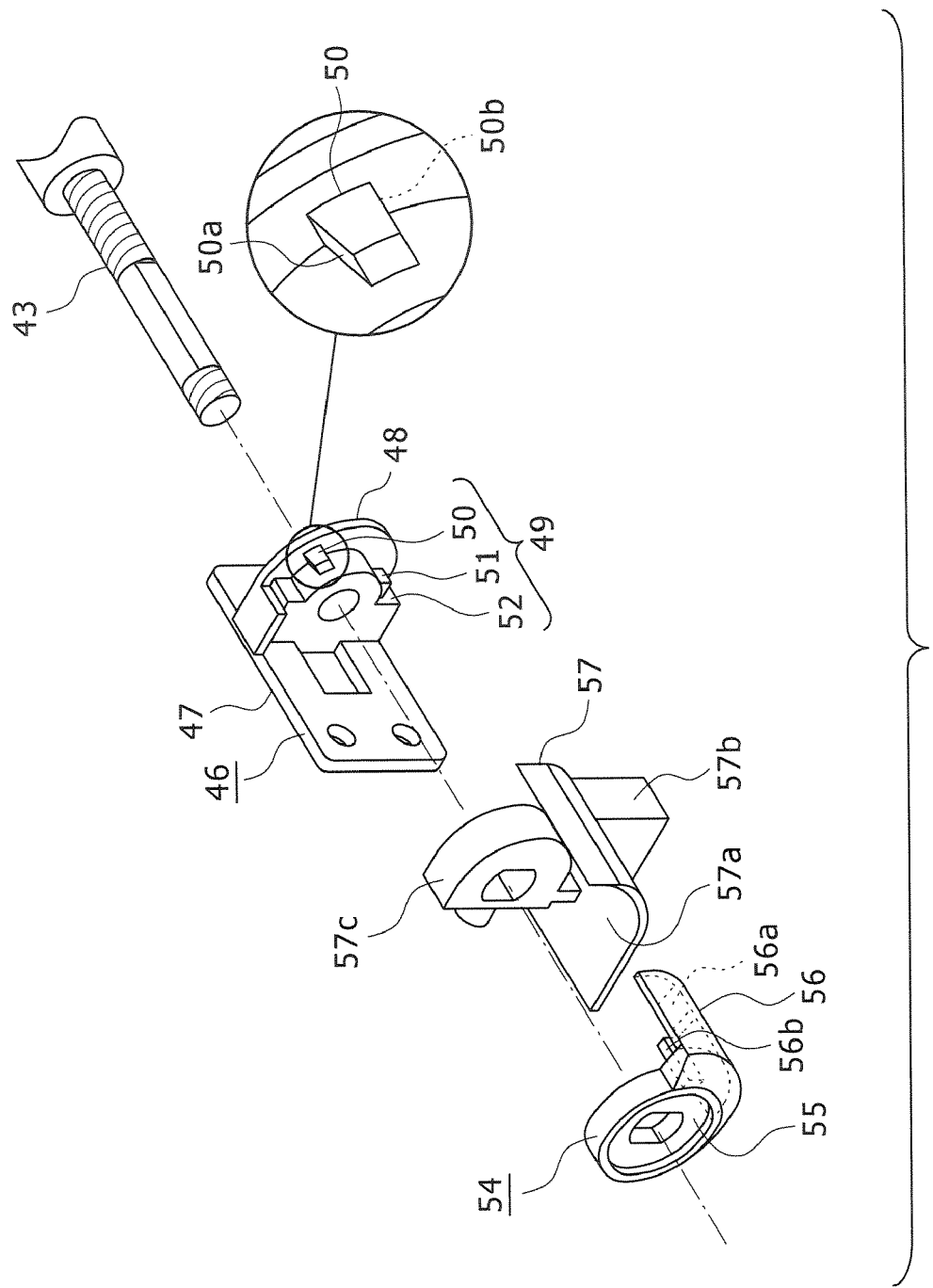
FIG. 18 is an enlarged exploded perspective view showing part of the pivoting mechanism.

Referring to an enlarged view of FIG. 18, the locking portion 49 has three controlling portions provided in a spaced relationship from each other in a circumferential direction and including a first controlling portion 50, a second controlling portion 51 and a third controlling portion 52 provided in order from above. The opposite side faces of the first controlling portion 50 in a circumferential direction are formed as a first controlling face 50a and a second controlling face 50b as seen in an enlarged view of FIG. 18. The first controlling face 50a is formed as an inclined face which is inclined toward the second controlling face 50b in the rightward direction. While the first controlling portion 50 and the second controlling portion 51 are positioned at the same position in the leftward and rightward direction, the third controlling portion 52 is positioned rightwardly of the first controlling portion 50 and the second controlling portion 51.

The pivot shafts 42 and 43 extend in the leftward and rightward direction and are inserted in the shaft supporting tabs 44b and 44c of the secured plate 44 and supported for rotation around an axis thereof by bearing portions 45b and 48 of the bearing members 45 and 46, respectively as seen in FIGS. 16 and 17. In a state wherein the pivot shafts 42 and 43 are supported by the bearing portions 45b and 48, respectively, they partly project outwardly from the bearing portions 45b and 48, respectively.

The stand side secured members 41 in pair are attached to outer end portions of the pivot shafts 42 and 43 in the axial direction, respectively. Each of the stand side secured members 41 has a secured portion 41a, and a mounted tab 41b projecting forwardly from an inner side edge of the secured portion 41a. The stand side secured members 41 are secured at the secured portions 41a thereof in the inside of the stand 4 and attached at the mounted tabs 41b thereof to the pivot shafts 42 and 43.

A spring member 53 in the form of a coil spring is supported on each of the pivot shafts 42 and 43. Each of the spring members 53 is supported at an end portion thereof by the bearing portion 45b or 48 of the bearing member 45 or 46 and at the other end portion thereof by the mounted tab 41b of the corresponding stand side secured member 41. Accordingly, the stand side secured members 41 are acted upon by turning force in one direction (direction indicated by an arrow mark R1 in FIG. 17) around the axis of the pivot shafts 42 and 43, that is, in a direction in which the lower end portion of the stand 4 approaches the lower end portion of the apparatus body 2, with respect to the body side secured member 40 by the spring members 53.

A controlled member 54 is supported for movement in an axial direction along but against rotation around the axis on the pivot shaft 43 which is positioned on the left side.

Referring to FIG. 18, the controlled member 54 has a shaft fitting portion 55 formed in a substantially annular ring, and a projection 56 projecting leftwardly from part of an outer circumferential portion of the shaft fitting portion 55. A first controlled portion 56a and a second controlled portion 56b are provided in a projecting manner at a left end portion of an inner face of the projection 56. The first controlled portion 56a and the second controlled portion 56b are positioned in a spaced relationship from each other in a circumferential direction.

The pivot shaft 43 is fitted in the shaft fitting portion 55 such that the controlled member 54 is supported at a right end portion of the pivot shaft 43, that is, a portion of the pivot shaft 43 which projects rightwardly from the bearing member 46.

Since the controlled member 54 is supported against rotation around its axis on the pivot shaft 43, it is normally biased by the spring member 53 in a direction same as that of pivoting force applied to the pivot shaft 43 from the spring member 53.

A pivoting angle changing lever 57 is supported against rotation around the axis thereof but for movement in the axial direction on the pivot shaft 43 as seen in FIGS. 16 and 17.

The pivoting angle changing lever 57 has a base face portion 57a directed substantially in the upward and downward direction, an operated portion 57b projecting downwardly from the base face portion 57a, and a supported tubular portion 57c projecting upwardly from the base face portion 57a. The pivot shaft 43 is fitted in the supported tubular portion 57c such that the pivoting angle changing lever 57 is supported for rotation around the axis thereof and for movement in the axial direction on the pivot shaft 43. The supported tubular portion 57c of the pivoting angle changing lever 57 is positioned between the shaft fitting portion 55 of the controlled member 54 and the bearing portion 48 of the bearing member 46. The base face portion 57a and the operated portion 57b of the pivoting angle changing lever 57 are positioned on the lower side of the controlled member 54.

The pivoting angle changing lever 57 is mounted for movement between a first operation position which is the left end in the operation direction and a second operation position which is the right end in the operation direction. The operated portion 57b of the pivoting angle changing lever 57 is positioned outwardly of the stand supporting portion 29 of the rear cover 8 in such a manner as to allow manual operation thereof.

A stop ring 58 is secured to a right end portion of the pivot shaft 43. A biasing spring 59 in the form of a compression coil spring is supported between the stop ring 58 and the shaft fitting portion 55 of the controlled member 54. Accordingly, the controlled member 54 is biased in a direction toward the bearing portion 48 of the bearing member 46 by the biasing spring 59.

In the following, action of the pivoting mechanism and action of the stand 4 caused by the action of the pivoting mechanism are described with reference to FIGS. 19 to 30.

The angle over which the stand 4 can be pivoted with respect to the apparatus body 2 has two modes including a first mode and a second mode. The first mode is used when the electronic apparatus 1 is used normally as a personal computer, and the second mode is used when the electronic apparatus 1 is not used as a personal computer such as when the electronic apparatus 1 is carried or is subject to maintenance. In the first mode, for example, the stand 4 can be pivoted over a range from 30° to 60° (first pivotal motion permitting angle) with respect to the apparatus body 2. In the second mode, for example, the stand 4 can be pivoted over a range from 0° to 90° (second pivotal motion permitting angle) with respect to the apparatus body 2.

In the first mode, the controlled member 54 and the pivoting angle changing lever 57 are positioned at the left end of the movement range, that is, at the first operation position, by the biasing force of the biasing spring 59. Further, the shaft fitting portion 55 of the controlled member 54 is pressed against the base face portion 57a of the pivoting angle changing lever 57 from the right side, and the projection 56 of the controlled member 54 is pressed against the bearing portion 48 of the bearing member 46 from the right side.

Figure 20:
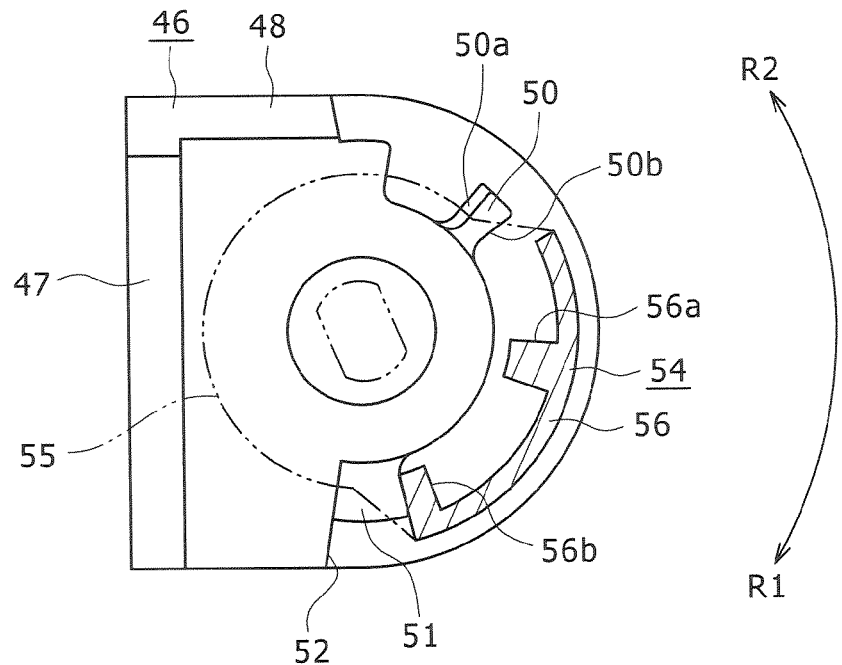
FIG. 20 is an enlarged sectional view illustrating a positional relationship between a locking portion and a controlled member when the pivoting angle of a stand with respect to an apparatus body is 30°.
Figure 21:
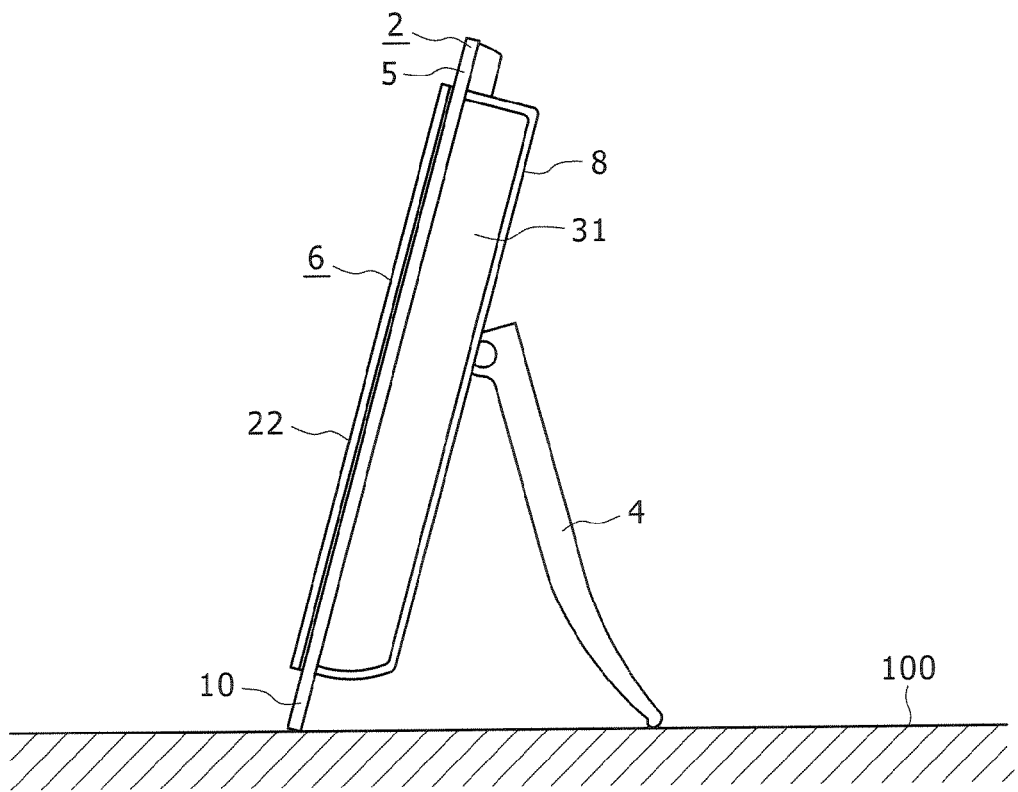
FIG. 21 is a side elevational view showing the stand whose pivoting angle with respect to the apparatus body is 30°.

In the first mode, when the pivoting angle of the stand 4 is 30°, the second controlled portion 56b of the controlled member 54 is engaged from above with the second controlling portion 51 of the locking portion 49 of the bearing member 46 as seen in FIG. 20, and the stand 4 is held at the position of 30° with respect to the apparatus body 2 as seen in FIG. 21.

At this time, the electronic apparatus 1 is placed on a receiving face 100 of a desk or the like in such a state that the placement pads 36 provided at the lower end portion of the base chassis 5 and the lower end of the stand 4 contact with the receiving face 100. It is to be noted that the electronic apparatus 1 may be modified such that the holding member 32 and the placement pads 36 attached to the holding member 32 are not provided but the electronic apparatus 1 is supported by the lower end of the base chassis 5 and the lower end of the stand 4 so as to be placed on the receiving face 100.

Since the electronic apparatus 1 is supported by the base chassis 5 and the stand 4 and placed on the receiving face 100 as described above, there is no necessity to provide another support for exclusive use on the base chassis 5. Consequently, reduction of the number of parts and simplification of the structure can be anticipated.

If, in the first mode, the apparatus body 2 is tilted such that, for example, the pivoting angle of the stand 4 with respect to the apparatus body 2 increases from 30°, then the pivot shafts 42 and 43 are rotated in the direction indicated by an arrow mark R2 in FIG. 20 against the biasing force of the spring members 53. Thereupon, the controlled member 54 is rotated together with the pivot shaft 43 simultaneously.

The controlled member 54 can be rotated until the first controlled portion 56a thereof reaches the second controlling face 50b of the first controlling portion 50 of the locking portion 49. Such a state that the first controlled portion 56a reaches the second controlling face 50b of the first controlling portion 50 as seen in FIG. 22 is the state wherein the pivoting angle of the stand 4 with respect to the apparatus body 2 is 60° as seen in FIG. 23.

Figure 22:
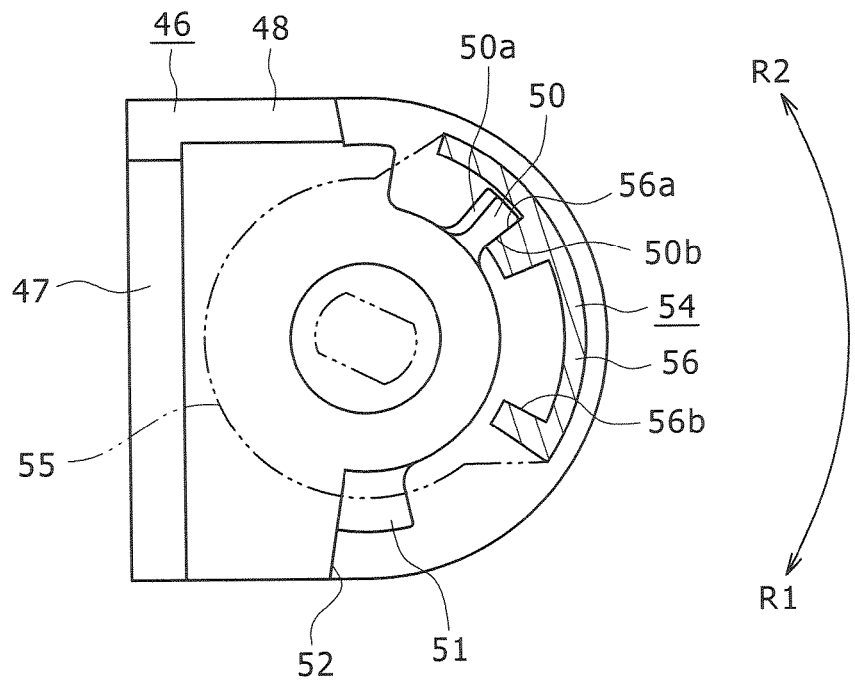
FIG. 22 is an enlarged sectional view illustrating a positional relationship between the locking portion and the controlled member when the pivoting angle of the stand with respect to the apparatus body is 60°.
Figure 23:
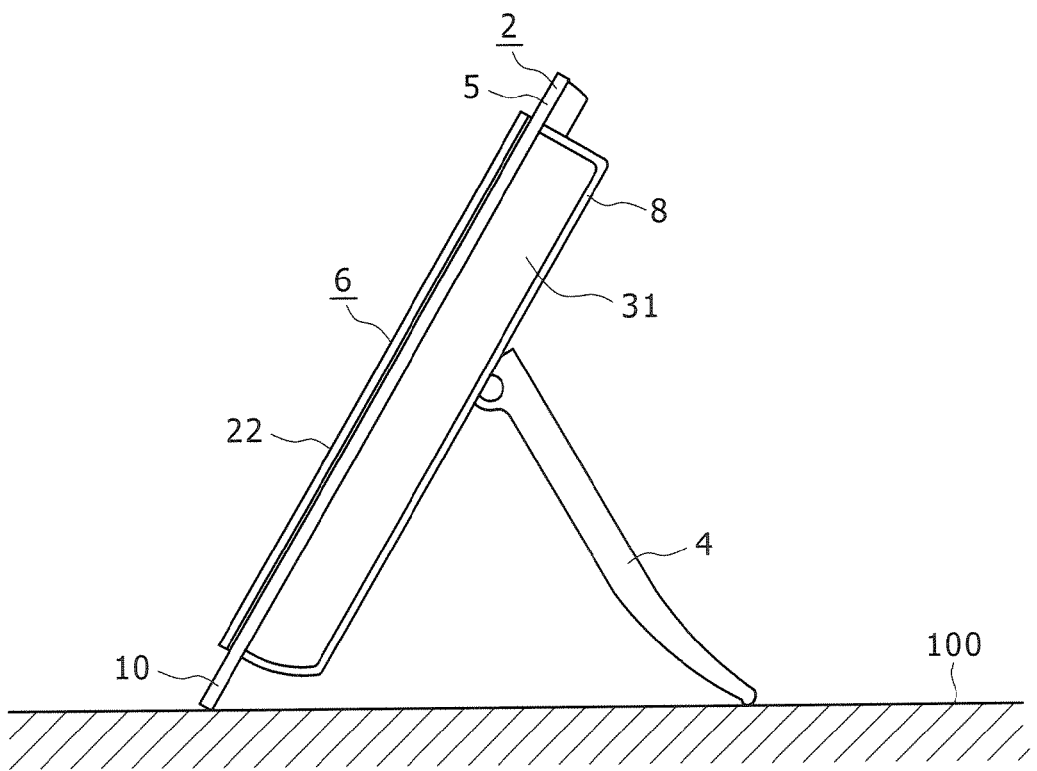
FIG. 23 is a side elevational view showing the stand whose pivoting angle with respect to the apparatus body is 60°.

On the contrary, if, in the first mode, the apparatus body 2 is tilted such that the pivoting angle of the stand 4 with respect to the apparatus body 2 decreases from 60°, then the pivot shafts 42 and 43 are rotated in the direction indicated by the arrow mark R1 in FIG. 22 by the biasing force of the spring members 53. Thereupon, the controlled member 54 is rotated integrally with the pivot shaft 43 simultaneously. At this time, since the stand 4 is biased in a direction in which the lower end portion thereof approaches the lower end portion of the apparatus body 2, the stand 4 is pivoted following up the change of the angle of the apparatus body 2 while it is held in contact with the receiving face 100. Accordingly, there is no necessity to manually pivot the stand 4 in a direction in which the lower end portion of the stand 4 approaches the apparatus body 2 after angular adjustment of the apparatus body 2 is performed. Consequently, enhancement of the convenience can be achieved.

In the first mode, the pivoting angle of the stand 4 can be changed over the angle from 30° to 60° as described above. At this time, while the biasing force in the direction indicated by the arrow mark R1 is normally applied from the spring members 53 to the stand 4 through the pivot shafts 42 and 43, since, in the electronic apparatus 1, the force originating from the frictional force between the stand 4 and the receiving face 100 and the self weight of the electronic apparatus 1 and applied to the receiving face 100 is set so as to overcome the biasing force of the spring members 53, the stand 4 can be held at an arbitrary angle within the range from 30° to 60° described hereinabove without slipping on the receiving face 100.

Figure 24:
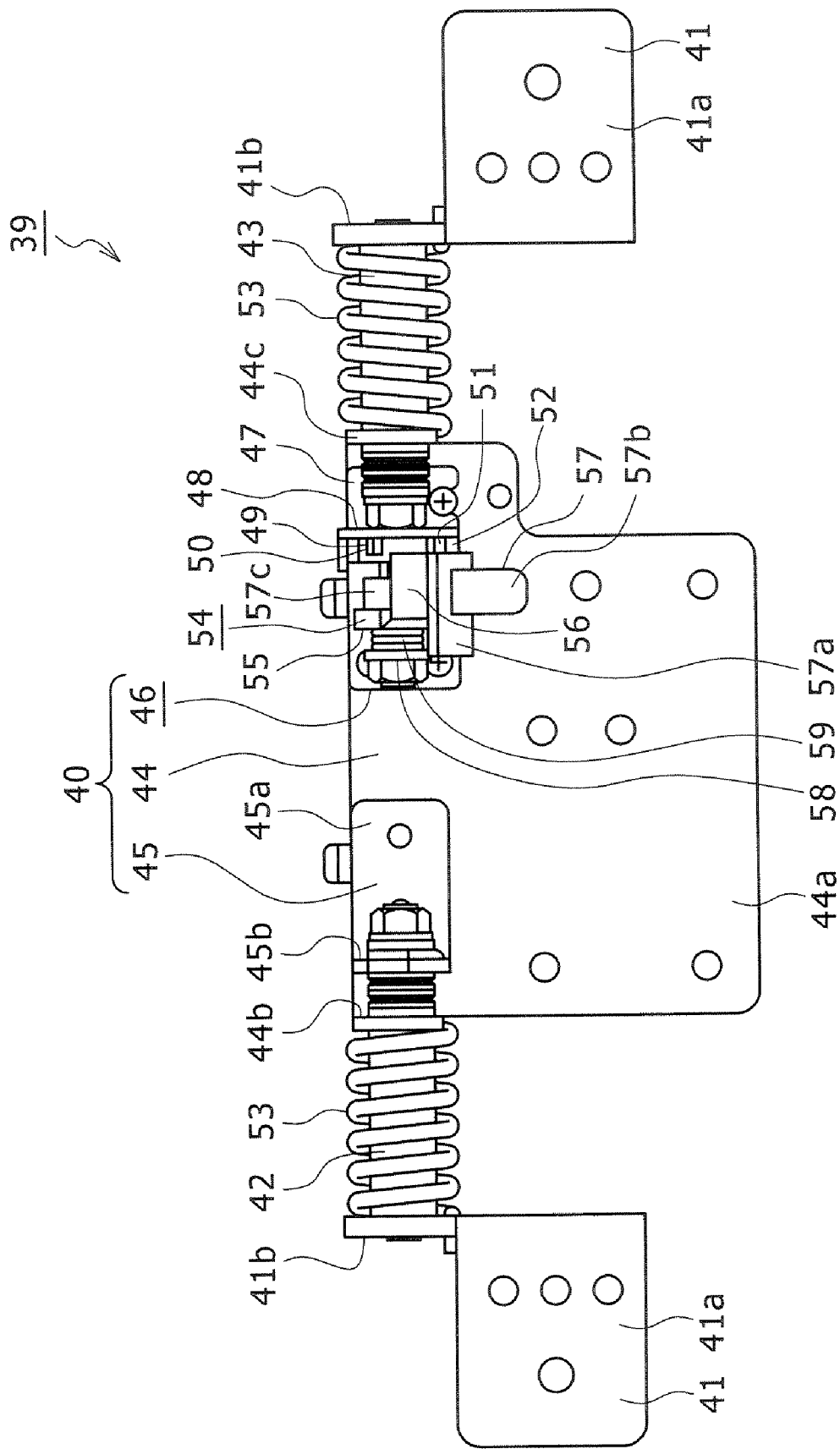
FIG. 24 is an enlarged rear elevational view showing the pivoting angle changing lever moved to a second position.

If, in the state wherein the pivoting angle of the stand 4 with respect to the apparatus body 2 is held within the range from 30+ to 60°, the pivoting angle changing lever 57 is operated so as to move rightwardly from the first operation position to the second operation position, then the second mode is established (refer to FIG. 24).

Figure 25:
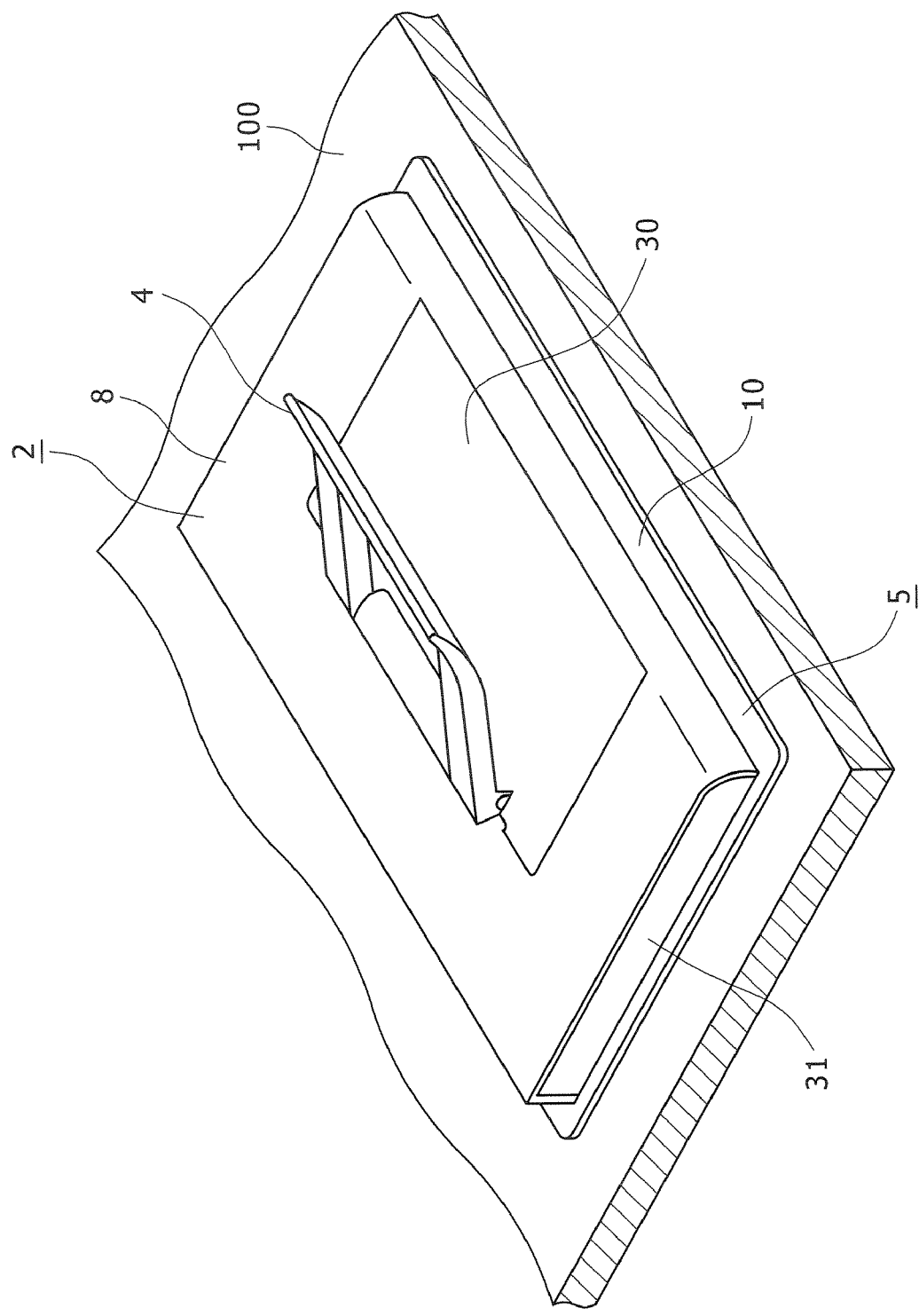
FIG. 25 is a perspective view showing the electronic apparatus when it is tried to set a second mode.

The second mode is used when the electronic apparatus 1 is not used or upon maintenance of the electronic apparatus 1. Therefore, the second mode is normally set in a state wherein the electronic apparatus 1 is not placed on the receiving face 100 using the stand 4, for example, in a state wherein the electronic apparatus 1 is placed on the receiving face 100 such that the display unit 6 contacts with the receiving face 100 as seen in FIG. 25.

When the pivoting angle changing lever 57 is moved rightwardly, the shaft fitting portion 55 of the controlled member 54 is pressed by the base face portion 57a of the pivoting angle changing lever 57 to move the controlled member 54 rightwardly.

Figure 26:
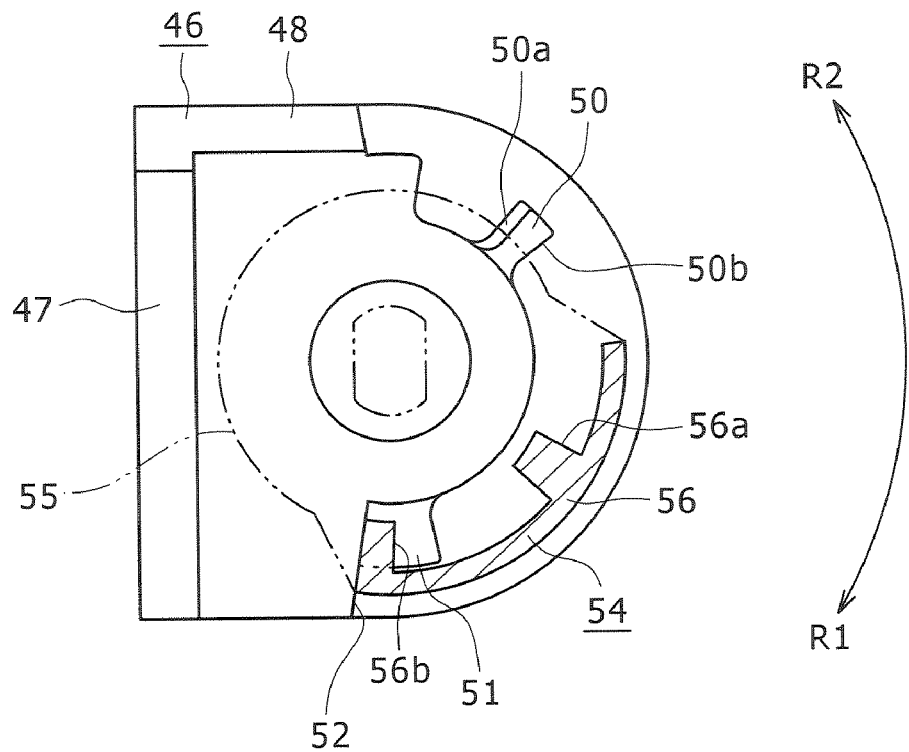
FIG. 26 is an enlarged sectional view illustrating a positional relationship between the locking portion and the controlled member when the pivoting angle of the stand with respect to the apparatus body is 0°.

If the pivoting angle changing lever 57 is moved to the second operation position, then the first controlled portion 56a and the second controlled portion 56b of the controlled member 54 are moved to positions thereof spaced rightwardly from the first controlling portion 50 and the second controlling portion 51 of the locking portion 49, respectively. Therefore, in a state wherein the stand 4 is not grasped, the controlled member 54 is rotated in the direction of the arrow mark R1 by the biasing force of the spring member 53 until the second controlled portion 56b is contacted with and pressed against the third controlling portion 52 of the locking portion 49 as seen in FIG. 26.

If, in the state wherein the second controlled portion 56b contacts with the third controlling portion 52, the manual operation of the pivoting angle changing lever 57 is canceled, then leftwardly moving force is applied from the biasing spring 59 to the controlled member 54 to move the projection 56 until the second controlled portion 56b is pressed from sidewardly against the second controlling portion 51 of the locking portion 49. Accordingly, the pivoting angle changing lever 57 is held at the second operation position.

Figure 27:
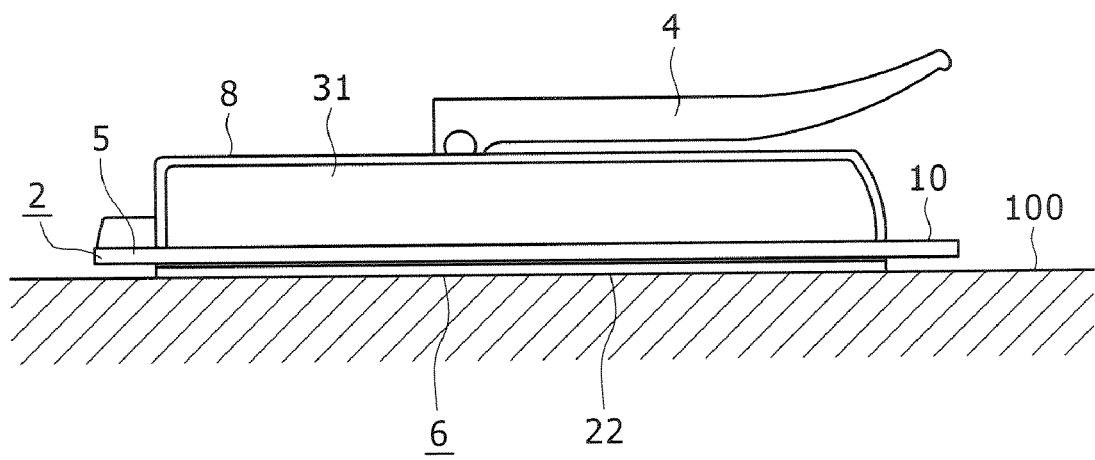
FIG. 27 is a side elevational view showing the stand whose pivoting angle with respect to the apparatus body is 0°.

The state wherein the second controlled portion 56b contacts with the third controlling portion 52 of the locking portion 49 is the state wherein the pivoting angle of the stand 4 is 0° as seen in FIG. 27. In the state wherein the pivoting angle of the stand 4 with respect to the apparatus body 2 is 0°, the stand 4 does not project in an oblique direction from the apparatus body 2. Therefore, for example, when the electronic apparatus 1 is carried, the stand 4 does not make an obstacle, and consequently, the convenience in carrying and so forth can be enhanced.

It is to be noted that, while the second controlled portion 56b of the controlled member 54 contacts with and is pressed against the third controlling portion 52 of the locking portion 49 to hold the stand 4 at the pivoting angle of 0°, it is otherwise possible, for example, for the stand 4 to contact with the rear face 2a of the apparatus body 2 to hold the stand 4 at the pivoting angle of 0°.

Since the stand 4 is held at the pivoting angle of 0° by the contact of the stand 4 with the rear face 2a of the apparatus body 2 in this manner, reduction of the number of parts and simplification of the mechanism can be achieved without the necessity for a control section for exclusive use for holding the stand 4 at the position of 0°.

If the stand 4 is pivoted in a direction in which the pivoting angle of the stand 4 with respect to the apparatus body 2 increases from the state wherein the pivoting angle of the stand 4 is 0°, then the second controlled portion 56b of the controlled member 54 is brought into sliding contact with the right side face of the second controlling portion 51 of the locking portion 49. Then, when the second controlled portion 56b is displaced from the second controlling portion 51, the controlled member 54 is moved leftwardly by the biasing force of the biasing spring 59. By the leftward movement of the controlled member 54, the supported tubular portion 57c of the pivoting angle changing lever 57 is pressed leftwardly by the shaft fitting portion 55 so that the pivoting angle changing lever 57 is moved from the second operation position to the first operation position.

In this manner, when the stand 4 is pivoted from the position of 0°, the pivoting angle changing lever 57 is moved from the second operation position to the first position by the biasing spring 59. Therefore, there is no necessity to perform a manual operation to move the pivoting angle changing lever 57 from the second operation position to the first operation position. Consequently, enhancement of the operability can be anticipated.

When the pivoting angle changing lever 57 is moved to the second operation position, the first controlled portion 56a and the second controlled portion 56b of the controlled member 54 are moved to positions spaced rightwardly from the first controlling portion 50 and the second controlling portion 51 of the locking portion 49, respectively. Consequently, it is possible to grasp the stand 4 to pivot the stand 4 to the position of 90° in a direction in which the lower end portion of the stand 4 is spaced away from the lower end portion of the apparatus body 2.

If the stand 4 is pivoted to the position of 90° and then the manual operation of the pivoting angle changing lever 57 held at the second operation position is canceled, then the controlled member 54 and the pivoting angle changing lever 57 are moved leftwardly by the biasing force of the biasing spring 59. Consequently, the pivoting angle changing lever 57 is moved from the second operation position to the first operation position.

Figure 28:
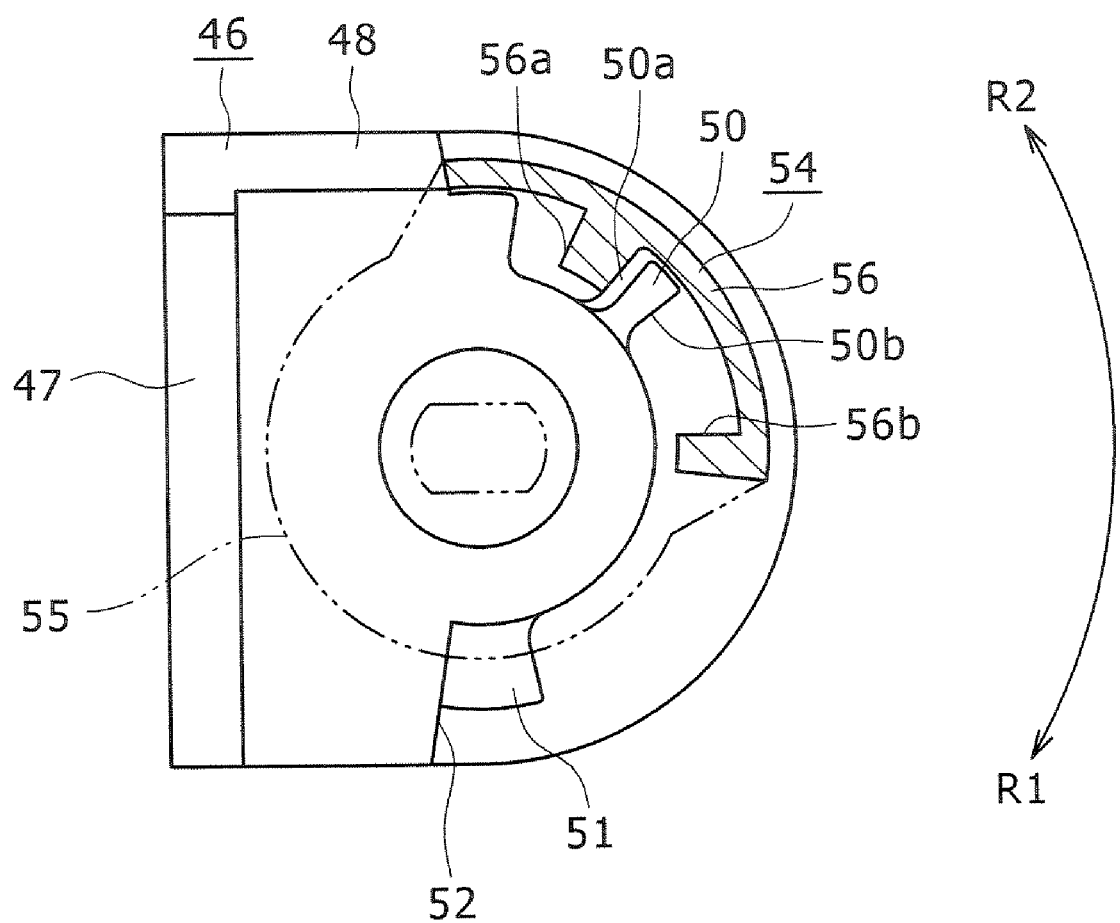
FIG. 28 is an enlarged sectional view illustrating a positional relationship between the locking portion and the controlled member when the pivoting angle of the stand with respect to the apparatus body is 90°.
Figure 29:
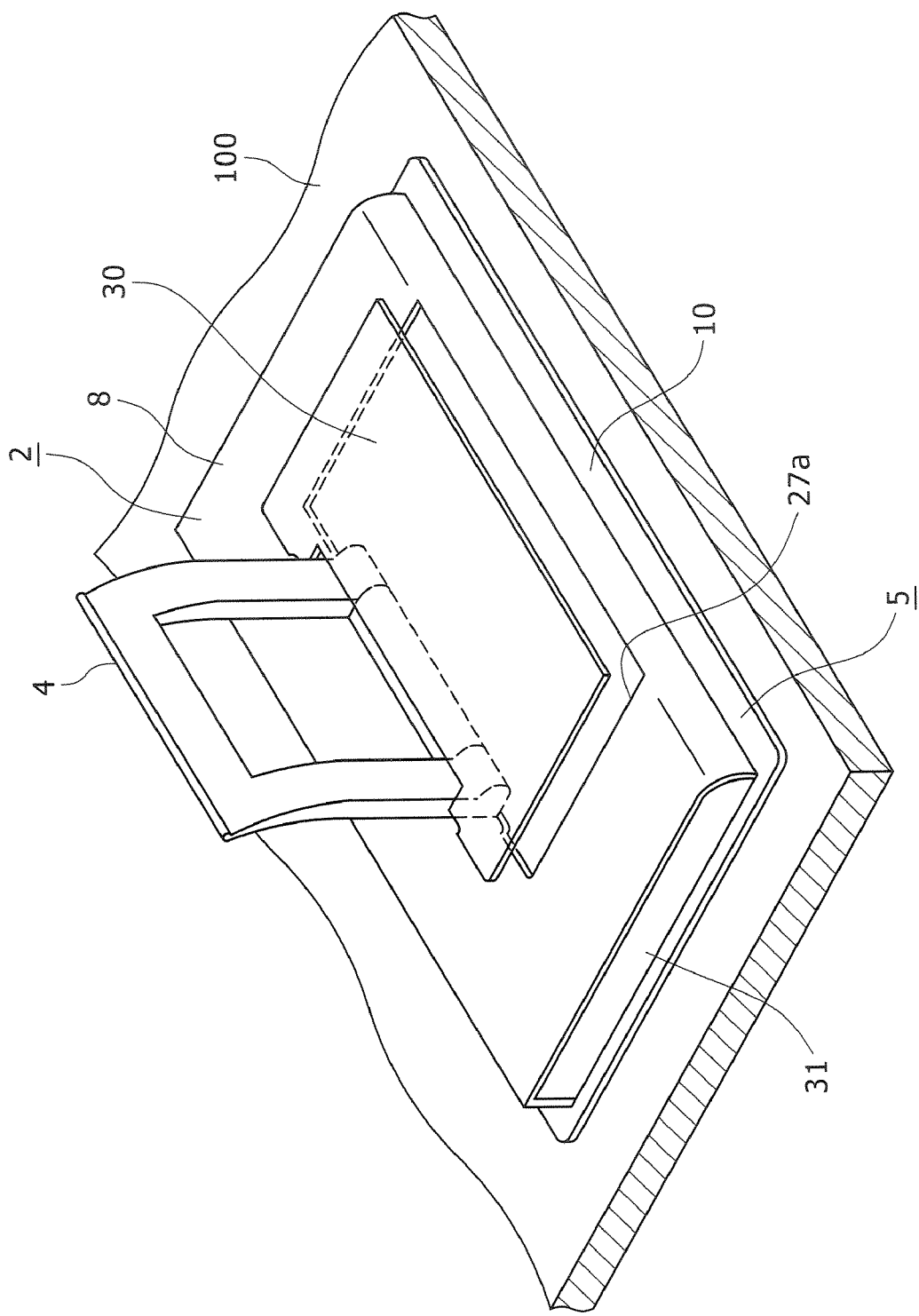
FIG. 29 is a side elevational view showing the stand whose pivoting angle with respect to the apparatus body is 90°.

When the controlled member 54 is moved leftwardly, the first controlled portion 56a is positioned on the upper side of the first controlling portion 50 of the locking portion 49. At this time, if the manual pivoting action of the stand 4 is canceled, then the pivoting force to urge the stand 4 to pivot in a direction toward the position of the pivoting angle of 0° is applied to the stand 4 by the biasing force of the spring members 53. Consequently, the stand 4 is pivoted until the first controlled portion 56a is pressed against and engaged with the first controlling face 50a of the first controlling portion 50 as seen in FIG. 28. Accordingly, the stand 4 is held at the position at which the pivoting angle thereof with respect to the apparatus body 2 is 90° as seen in FIG. 29.

In the state wherein the pivoting angle of the stand 4 with respect to the apparatus body 2 is 90°, the stand 4 does not make an obstacle to an opening or closing action of the lid 30 to open or close the maintenance opening 27a of the rear cover 8. Consequently, the opening or closing operation of the lid 30 can be performed readily.

Further, also upon maintenance through the maintenance opening 27a, the stand 4 does not make an obstacle. Consequently, the maintenance can be performed readily.

If, in the state wherein the pivoting angle of the stand 4 with respect to the apparatus body 2 is held at 90°, the pivoting angle changing lever 57 is operated to move rightwardly from the first operation position to the second operation position, then the first mode can be established.

Figure 30:
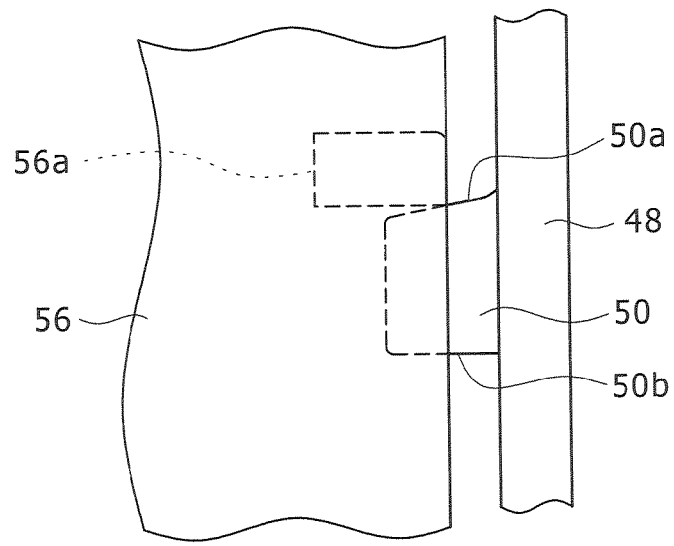
FIG. 30 is a schematic view showing a first controlled portion of the controlled member slidably moving on a first controlling face of a first controlling portion of a bearing member.

When the pivoting angle changing lever 57 is moved to the second operation position, the first controlled portion 56a of the controlled member 54 slidably moves on the first controlling face 50a of the first controlling portion 50 of the locking portion 49 as seen in FIG. 30. At this time, the first controlled portion 56a of the controlled member 54 remains pressed against the first controlling face 50a by the biasing force of the spring members 53. However, since the first controlling face 50a is formed as an inclined face, the controlled member 54 and the pivoting angle changing lever 57 are smoothly moved rightwardly and the first controlled portion 56a and the first controlling face 50a are brought out of contact with each other.

Accordingly, the operation to move the pivoting angle changing lever 57 from the first operation position to the second operation position can be performed smoothly.

When the contact between the first controlled portion 56a and the first controlling face 50a is canceled, if the manual operation of the pivoting angle changing lever 57 is canceled, then leftward moving force is applied to the controlled member 54 from the biasing spring 59. Consequently, the controlled member 54 and the pivoting angle changing lever 57 are moved leftwardly integrally with each other. When both of the first controlled portion 56a and the second controlled portion 56b of the controlled member 54 are positioned between the first controlling portion 50 and the second controlling portion 51 of the locking portion 49 and the controlled member 54 is rotated by the biasing force of the spring member 53, the second controlled portion 56b is brought into contact and engagement with the second controlling portion 51 thereby to stop the rotation of the controlled member 54 as seen from FIG. 19.

Figure 19:
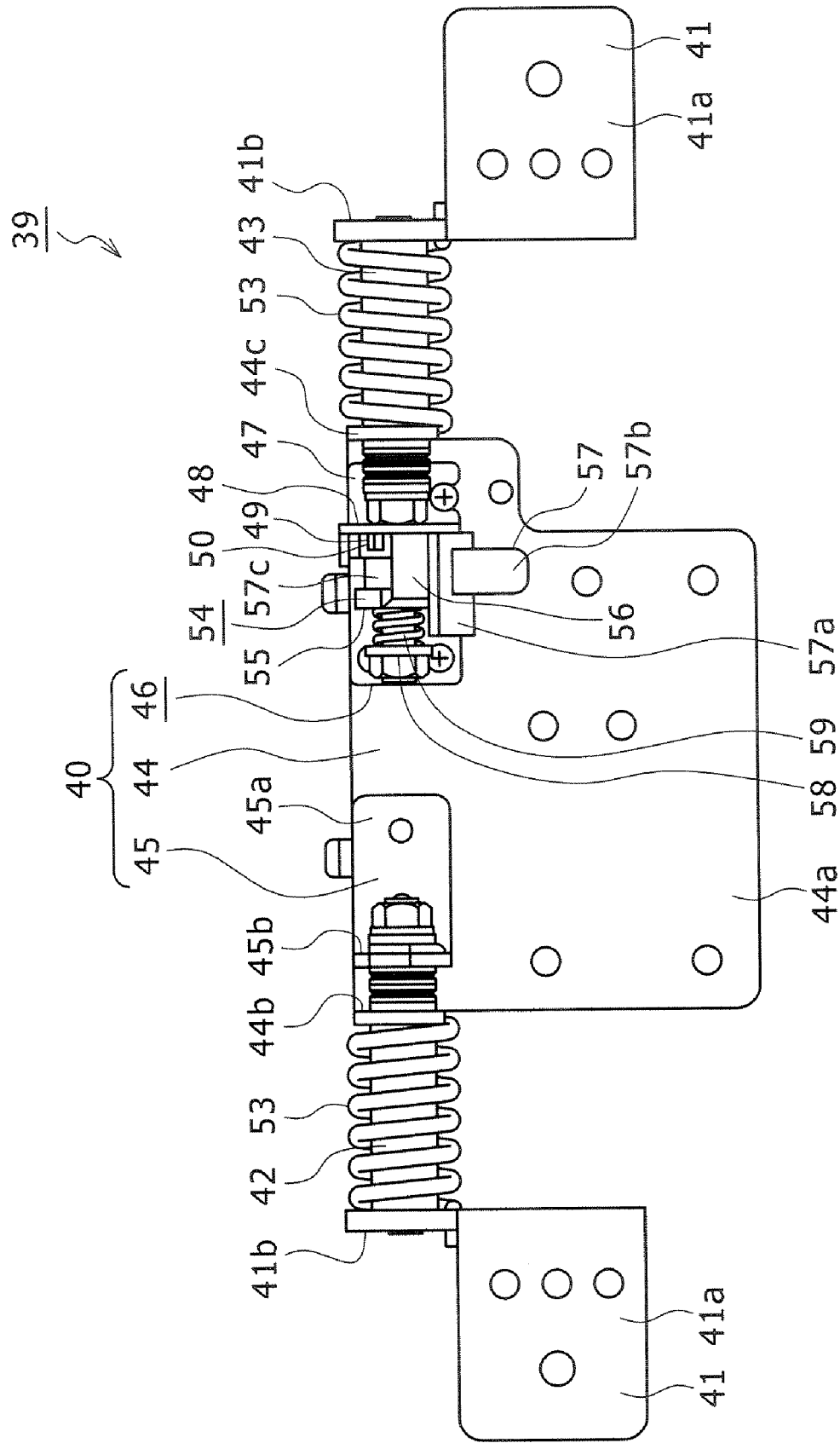
FIG. 19 is an enlarged rear elevational view showing a pivoting angle changing lever at a first position.

Consequently, the first mode is established, and the stand 4 is held in the state of the pivoting angle of 30° with respect to the apparatus body 2 as seen in FIG. 21. The pivoting angle changing lever 57 is held at the first operation position as seen in FIG. 19.

As described above, in the electronic apparatus 1, changeover between the first mode and the second mode can be performed by operating the pivoting angle changing lever 57. Consequently, the electronic apparatus 1 can be used as a personal computer normally. On the other hand, when the electronic apparatus 1 is not used as a personal computer, for example, when the electronic apparatus 1 is carried or upon maintenance of the electronic apparatus 1, the suitable mode therefor can be set readily.

Further, since, in the second mode, the angle of the stand 4 with respect to the apparatus body 2 can be changed from 0° to 90°, a work necessary for the electronic apparatus 1 such as carrying or maintenance can be performed readily without any trouble.

A camera unit 60 is disposed in the outer peripheral portion 10 of the base chassis 5 as seen in FIGS. 1 to 4. The camera unit 60 is, for example, for a visual telephone and is supported for pivotal motion on the base chassis 5 through a pivot shaft, which extends leftwardly and rightwardly, by means of a hinge mechanism not shown. The pivotal motion permitting angle of the camera unit 60 with respect to the base chassis 5 is, for example, ±10° with respect to a reference position, and the camera unit 60 can be held at an arbitrary angle within the range of the pivotal motion permitting angle thereof.

An image pickup lens 60a is provided on the front face of the camera unit 60. The angle of view of the image pickup lens 60a is, for example, 55° (refer to FIG. 31). The direction of the optical axis of the image pickup lens 60a is set in the following manner.

Figure 31:
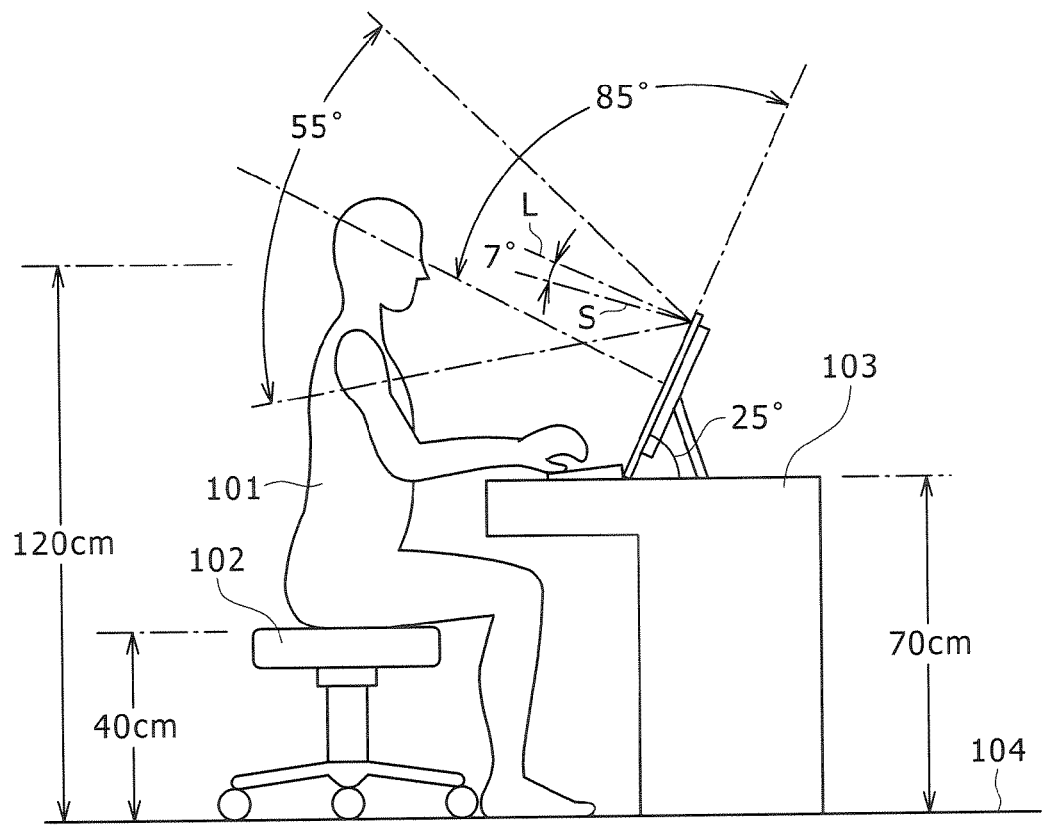
FIG. 31 is a schematic view illustrating the directions of the optical axis of an image pickup lens of a camera unit in a standard state and a reference state when a user uses the electronic apparatus.

Referring to FIG. 31, in a standard use state when a user 101 uses the electronic apparatus 1, usually the height of a chair 102 is 40 cm; the height of a desk 103 is 70 cm; and the height of the eyes of the user 101 from the floor 104 is 120 cm.

The display face of the display panel of the electronic apparatus 1 placed on the desk 103 is inclined at an angle of 25° with respect to the vertical direction, and the user 101 visually observes the display face of the display panel at an angle of 85°.

The direction S of the optical axis of the image pickup lens 60a at the reference position of the camera unit 60, that is, in the reference state, is set to a little downward direction, for example, by 7° with respect to the normal line L to the display panel 21. Accordingly, the camera unit 60 is mounted for pivotal motion within a range of ±10° with reference to the state thereof wherein it is inclined downwardly by 7°.

Where the camera unit 60 is disposed, at the reference position, in a downwardly inclined relationship by a little angle, for example, by 7° with respect to the normal line L in this manner, the face of the user 101 is likely to be reflected at a central portion of the display screen of an apparatus of the opposite party, for example, in a visual telephone system. Consequently, the convenience in use of the electronic apparatus 1 when it is used in a visual telephone system or the like can be enhanced.

Further, in the electronic apparatus 1, since the camera unit 60 is mounted for pivotal motion with respect to the base chassis 5, the position at which an image is reflected can be adjusted.

It is to be noted that the forward, rearward, upward, downward, leftward and rightward directions in the foregoing description are used for the convenience of description, and the present invention can be applied irrespective of the directions.

While a preferred embodiment of the present invention has been described using specific terms, such description is for illustrative purposes only, and it is to be understood that changes and variations may be made without departing from the spirit or scope of the following claims.

What is claimed is:

1. An electronic apparatus, comprising:
   a base chassis formed as a unitary member from a transparent material, the base chassis including
      a first mounting face section and a second mounting face section positioned on opposite sides of each other,
      a bottom face wall extending on a first plane,
      a peripheral flange, and a mounting recess that is partially enclosed by the bottom face wall and a peripheral wall, the peripheral flange protruding outward from the peripheral wall on a second plane that is parallel to the first plane, and extending beyond the bottom face wall;

a display unit having a display panel and attached to said first mounting face section of said base chassis and inserted in the mounting recess;

a control circuit board attached to said second mounting face section of said base chassis;

a rear cover attached to said second mounting face section of said base chassis and configured to cover said control circuit board, the rear cover being positioned on the base chassis such that an entire outer perimeter of the rear cover adjacent to the base chassis is disposed within an entire outer perimeter of the peripheral flange; and a camera unit disposed on the peripheral flange and pivotally supported on the base chassis by a pivot shaft.

2. The electronic apparatus according to claim 1, wherein the peripheral wall is a connecting portion adjoining an inner peripheral edge of the peripheral flange and an outer peripheral edge of said bottom face wall and is non-parallel to both the peripheral flange and said bottom face wall.

3. The electronic apparatus according to claim 2, wherein said bottom face wall of said base chassis is formed with a thickness smaller than a thickness of the peripheral flange.

4. The electronic apparatus according to claim 1, further comprising a stand supported for pivotal motion on a rear face of said cover such that, in an upright position, said electronic apparatus is supported on a receiving face via said stand and the peripheral flange of said base chassis.

5. The electronic apparatus according to claim 4, further comprising:
a holding member attached to a lower end portion of said base chassis; and
an elastic placement pad attached to said holding member and configured to contact the receiving face.

6. The electronic apparatus according to claim 1, wherein the control circuit board includes a front side and a back side, the back side having electrical components thereon, and
wherein the front side of the control circuit board is attached to the second mounting face section.

7. The electronic apparatus according to claim 1, wherein the base chassis further includes at least one through hole extending through the first and second mounting face sections, thereby providing heat ventilation.

8. The electronic apparatus according to claim 1, wherein the base chassis further includes at least one luminous lamp section disposed in the outer peripheral flange.

9. The electronic apparatus according to claim 8, wherein the at least one luminous lamp section includes:
a groove disposed within the peripheral flange, the groove including
an interior face portion formed such that a depth of the groove increases in a forward direction towards the first mounting face section, and
an aperture open to the second mounting face section of the base chassis,
at least one light emitting lamp element positioned such that emitted light illuminates the groove, and
a mounting board supporting the at least one light emitting lamp.

10. An electronic apparatus, comprising:
a base chassis formed as a unitary member from a transparent material, the base chassis including
a first mounting face section and a second mounting face section positioned on opposite sides of each other, and
a mounting recess defined by
an inner recessed portion defining a first plane,
a connecting portion formed on the inner recessed portion, the connecting portion extending angularly outward, with respect to the first plane of the inner recessed portion, from an outer perimeter of the inner recessed portion, and
an outer peripheral flange having an inner perimeter that is connected to the connecting portion, the outer peripheral flange extending angularly in an outward direction from the connecting portion, such that the outer peripheral flange extends beyond the outer perimeter of a bottom wall of the inner recessed portion;

a display unit having a display panel and attached to said first mounting face section of said base chassis;

a control circuit board attached to said second mounting face section of said base chassis; and a rear cover attached to said second mounting face section of said base chassis and configured to cover said control circuit board, the rear cover being positioned on the base chassis such that an entire outer perimeter of the rear cover adjacent to the base chassis is disposed within an entire outer perimeter of the outer peripheral flange, wherein the connecting portion is substantially perpendicular to the first plane of the inner recessed portion and the outer peripheral flange extends on a second plane that is parallel with and distinct from the first plane of the inner recessed portion, such that the outer peripheral flange is substantially perpendicular to the connecting portion.

11. The electronic apparatus according to claim 10, wherein the inner recessed portion of the base chassis is a bottom wall, a thickness of the bottom wall being less than a thickness of the peripheral flange.

12. The electronic apparatus according to claim 1, wherein the peripheral wall extends from an entire outer perimeter to the bottom face wall, and
wherein the peripheral flange protrudes from an entire perimeter of the peripheral wall.

13. An electronic apparatus, comprising:
a base chassis formed as a unitary member from a transparent material, the base chassis including
a first mounting face section and a second mounting face section positioned on opposite sides of each other,
a bottom face portion extending on a first plane,
a peripheral flange, and
a mounting recess that is partially enclosed by the bottom face portion and a peripheral wall, the peripheral flange protruding angularly outward from the wall;

a display unit having a display panel and attached to said first mounting face section of said base chassis and inserted in the mounting recess;

a control circuit board attached to said second mounting face section of said base chassis;

a rear cover attached to said second mounting face section of said base chassis and configured to cover said control circuit board; and at least one luminous lamp section disposed in the outer peripheral flange, the at least one luminous lamp section including
a groove disposed within the peripheral flange, the groove including
an interior face portion formed such that a depth of the groove increases in a forward direction towards the first mounting face section, and an aperture open to the second mounting face section of the base chassis,
at least one light emitting lamp element positioned such that emitted light illuminates the groove, and
a mounting board supporting the at least one light emitting lamp.

* * * * *